(12) United States Patent
Uno

(10) Patent No.: US 11,217,045 B2
(45) Date of Patent: Jan. 4, 2022

(54) INFORMATION PROCESSING SYSTEM AND SERVER

(71) Applicant: TOYOTA JIDOSHA KABUSHIKI KAISHA, Toyota (JP)

(72) Inventor: Satoshi Uno, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 186 days.

(21) Appl. No.: 16/571,704

(22) Filed: Sep. 16, 2019

(65) Prior Publication Data

US 2020/0098203 A1    Mar. 26, 2020

(30) Foreign Application Priority Data

Sep. 26, 2018    (JP) .............................. JP2018-179973

(51) Int. Cl.
| | | |
|---|---|---|
| *G07C 5/08* | (2006.01) | |
| *G07C 5/00* | (2006.01) | |
| *G08G 1/01* | (2006.01) | |
| *B60W 40/09* | (2012.01) | |
| *G08G 1/048* | (2006.01) | |
| *B60W 30/08* | (2012.01) | |
| *G08G 1/16* | (2006.01) | |
| *B60W 50/02* | (2012.01) | |
| *B60T 7/22* | (2006.01) | |
| *B60T 8/1761* | (2006.01) | |

(52) U.S. Cl.
CPC ............. *G07C 5/085* (2013.01); *G07C 5/008* (2013.01)

(58) Field of Classification Search
USPC ........................................................ 701/31.4
See application file for complete search history.

(56) References Cited

U.S. PATENT DOCUMENTS

| | | | |
|---|---|---|---|
| 2010/0217486 A1* | 8/2010 | Taguchi .................... | B60T 7/22 701/41 |
| 2012/0083964 A1* | 4/2012 | Montemerlo ............. | G06T 7/74 701/26 |
| 2017/0183015 A1* | 6/2017 | Phelan ...................... | G08G 1/20 |
| 2017/0263121 A1* | 9/2017 | Ono .......................... | G06F 3/00 |
| 2018/0012490 A1* | 1/2018 | Jodorkovsky ..... | G08G 1/096775 |
| 2018/0173224 A1* | 6/2018 | Kim ....................... | G05D 1/0061 |
| 2020/0098203 A1* | 3/2020 | Uno ....................... | B60W 40/09 |
| 2020/0392916 A1* | 12/2020 | Hellstrom ............... | F02D 41/22 |

FOREIGN PATENT DOCUMENTS

| | | |
|---|---|---|
| JP | 2013-544695 A | 12/2013 |
| JP | 2017-162160 A | 9/2017 |

* cited by examiner

*Primary Examiner* — Tyler D Paige
(74) *Attorney, Agent, or Firm* — Sughrue Mion, PLLC

(57) ABSTRACT

An information processing system is configured to include a target vehicle data acquisition unit configured to acquire target vehicle data including a travel state of a target vehicle, driving operation information of the target vehicle, and position information of the target vehicle on a map, a behavior occurrence position recognition unit configured to recognize a behavior occurrence position that is a position where the target vehicle performs an unstable behavior, based on the target vehicle data, and a cause determination unit configured to determine whether or not the unstable behavior at the behavior occurrence position is caused by the driver, based on at least one of the travel state of the target vehicle and the driving operation information of the target vehicle.

20 Claims, 12 Drawing Sheets

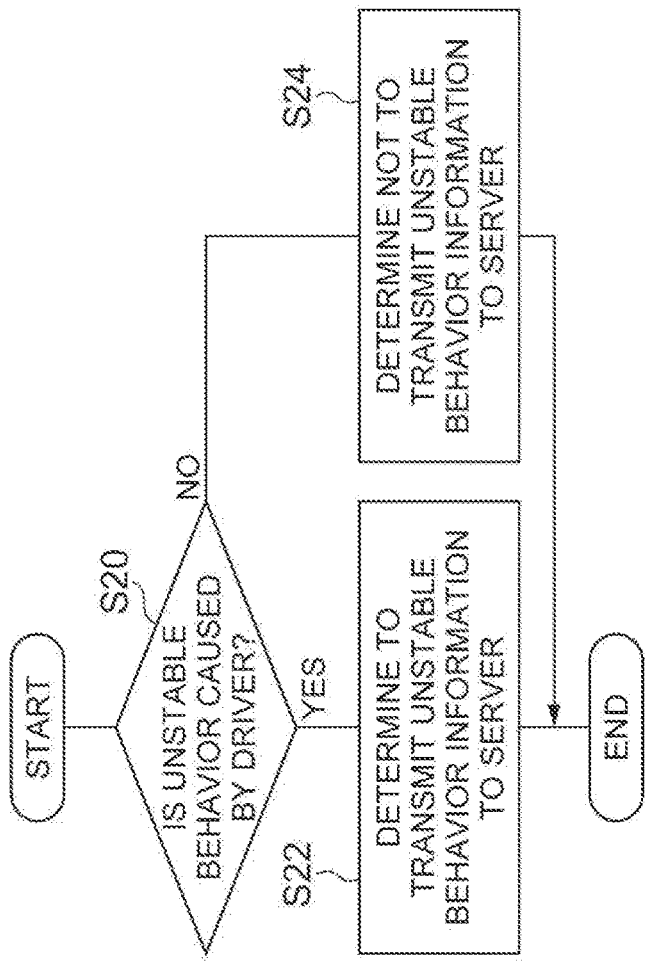
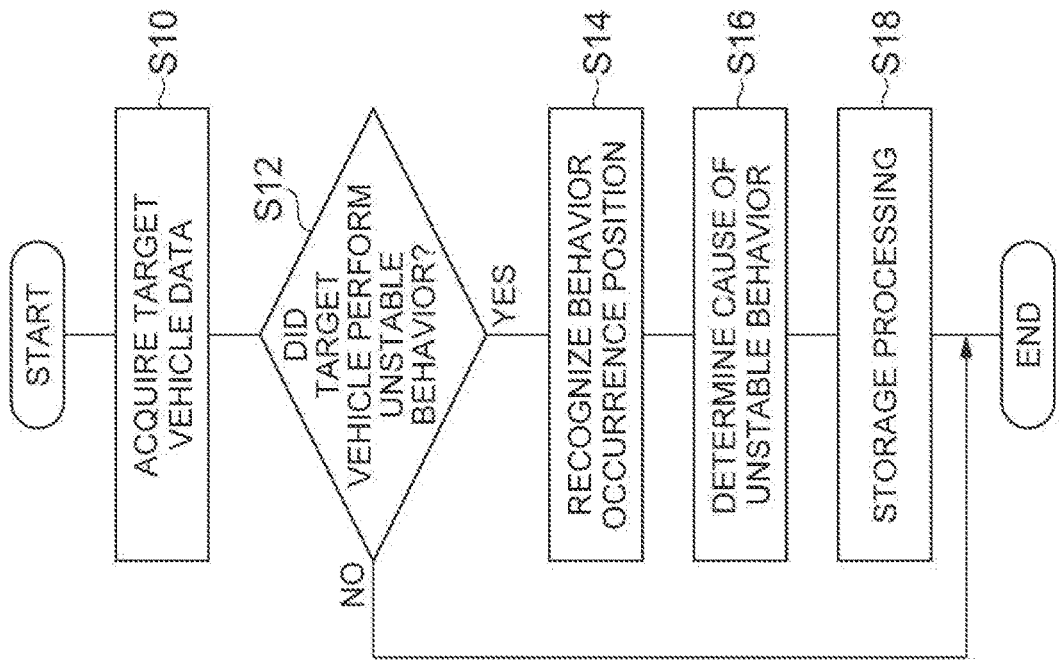

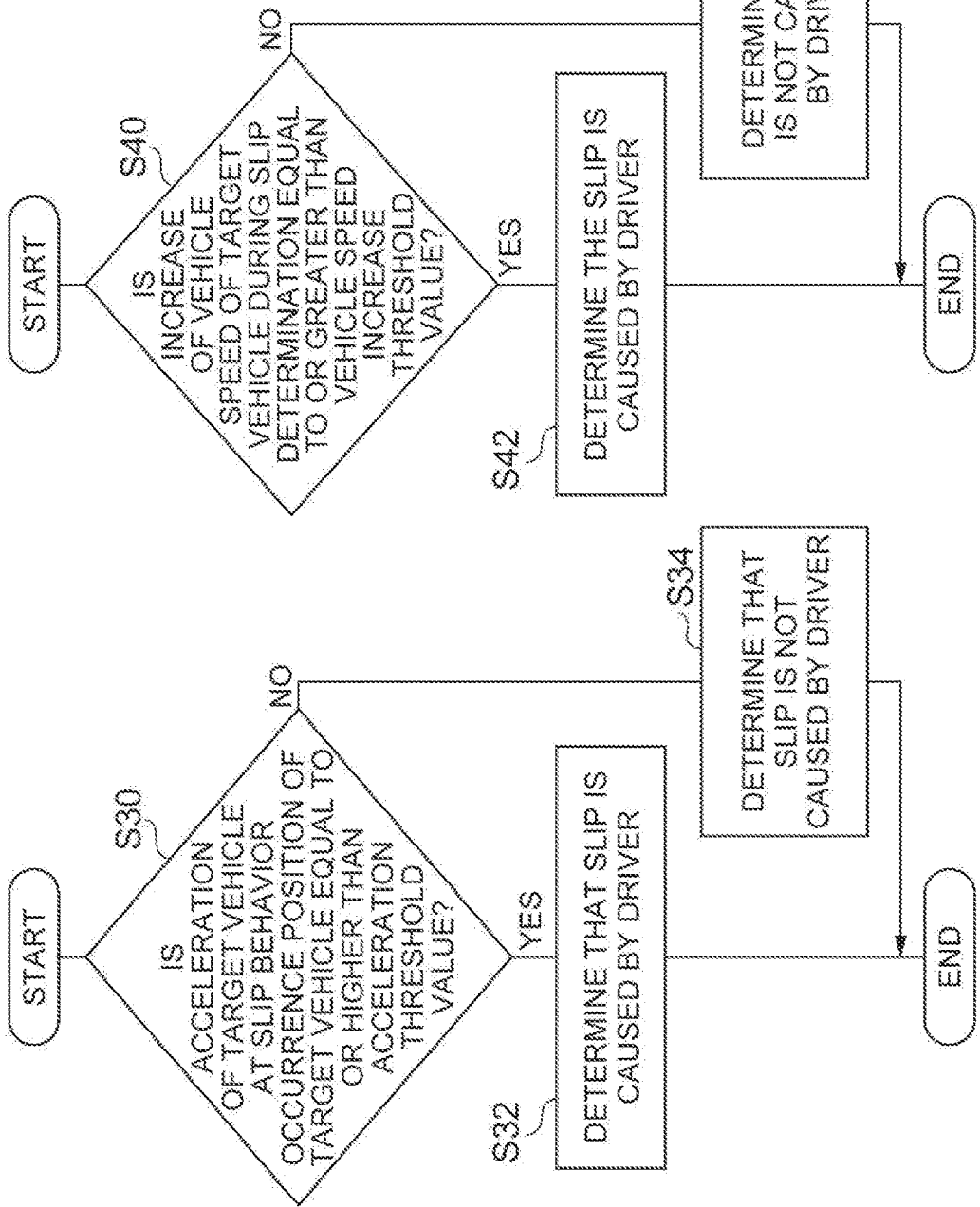

INFORMATION PROCESSING SYSTEM AND SERVER

TECHNICAL FIELD

The present disclosure relates to an information processing system and a server.

CROSS-REFERENCE TO RELATED APPLICATION

This application claims the benefit of priority from Japanese Patent Application No. 2018-179973, filed Sep. 26, 2018, the entire contents of which are incorporated herein by reference.

BACKGROUND

Japanese Unexamined Patent Publication No. 2013-544695, for example, is known for information processing relating to travel of a vehicle. This publication discloses processing for notifying a nearby other vehicle of a zone where the driver felt that autonomous travel is not safe in the travel of an autonomous driving vehicle.

SUMMARY

Incidentally, as information relating to travel of a vehicle, it is considered to collect information on a position where the vehicle performs an unstable behavior. However, there are various causes of unstable behavior of the vehicle. Therefore, it is not appropriate to uniformly handle the information on the position where the vehicle performed the unstable behavior at all times.

Therefore, in the present technical field, it is desired to store the behavior occurrence positions where the vehicle performed the unstable behavior in association with information on the causes of the unstable behavior.

According to an aspect of the present disclosure, there is provided an information processing system that is configured to include a target vehicle data acquisition unit configured to acquire target vehicle data including a travel state of a target vehicle, driving operation information of the target vehicle, and position information of the target vehicle on a map, a behavior occurrence position recognition unit configured to recognize a behavior occurrence position that is a position where the target vehicle performs an unstable behavior, based on the target vehicle data, a cause determination unit configured to determine whether or not the unstable behavior at the behavior occurrence position is caused by the driver, based on at least one of the travel state of the target vehicle and the driving operation information of the target vehicle, and a memory processing unit configured to associate, then store in a storage database, the result of determination performed by the cause determination unit with unstable behavior information relating to the unstable behavior at the behavior occurrence position.

In the information processing system according to an aspect of the present disclosure, the behavior occurrence position where the target vehicle performed the unstable behavior is recognized from the target vehicle data, and whether or not the unstable behavior at the behavior occurrence position is caused by the driver is determined. Then, the unstable behavior information relating to the unstable behavior at the behavior occurrence position is associated with the result of determination performed by the cause determination unit, and then, the result is stored in the storage database. Therefore, according to the information processing system, the unstable behavior information at the behavior occurrence position where the target vehicle performed the unstable behavior can be stored in association with the result of determination whether or not the unstable behavior is caused by the driver.

In the information processing system according to the aspect of the present disclosure, the unstable behavior may be a slip of the target vehicle. If an acceleration of the target vehicle at the slip behavior occurrence position of the target vehicle is equal to or greater than an acceleration threshold value, the cause determination unit may be configured to determine that the slip of the target vehicle is caused by the driver.

In the information processing system according to the aspect of the present disclosure, the unstable behavior may be a slip of the target vehicle. The driving operation information of the target vehicle include at least one of an acceleration amount performed by the driver of the target vehicle, an brake operation amount performed by the driver of the target vehicle, and a steering angle performed by the driver, of the target vehicle. The cause determination unit may be configured to determine whether or not the slip of the target vehicle is caused by the driver, based on at least the driving operation information of the target vehicle.

In the information processing system according to the aspect of the present disclosure, the unstable behavior may be a slip of the target vehicle. The travel state of the target vehicle include at least one of an acceleration and a vehicle speed of the target vehicle driven by the driver. The cause determination unit may be configured to determine whether or not the slip of the target vehicle is caused by the driver, based on at least the travel state of the target vehicle.

In the information processing system according to the aspect of the present disclosure, the unstable behavior may be a slip of the target vehicle. If an increase of the vehicle speed of the target vehicle during the slip determination is equal to or greater than a vehicle speed increase threshold value, the cause determination unit may be configured to determine that the slip is caused by the driver.

In the information processing system according to the aspect of the present disclosure, a vehicle state of the target vehicle may be included in the target vehicle data. The cause determination unit may be configured to determine whether or not the unstable behavior at the behavior occurrence position is caused by a vehicle, based on the vehicle state of the target vehicle. If the cause determination unit determines whether or not the unstable behavior at the behavior occurrence position is caused by the vehicle, the memory processing unit may be configured to associate, then store in a storage database, the result of determination performed by the cause determination unit with unstable behavior information relating to the unstable behavior at the behavior occurrence position.

In the information processing system according to the aspect of the present disclosure may be configured to further include a server configured to be capable of communicating with the plurality of target vehicles. The server may be configured to include the cause determination unit. If a behavior causing location where the number of times the target vehicle performed the unstable behavior is equal to or greater than the number of times threshold value is specified based on the behavior occurrence position recognized by the behavior occurrence position recognition unit, the cause determination unit may be configured to determine that the unstable behavior at the behavior causing location is not caused by the driver.

In the information processing system according to the aspect of the present disclosure may be configured to further include an information acquisition unit configured to acquire the unstable behavior information according to the behavior occurrence position existing on a traveling route of an autonomous driving based on the traveling route of the autonomous driving set in advance in the autonomous driving vehicle and the unstable behavior information stored in the database, and an instability suppressing behavior calculation unit configured to calculate an instability suppressing behavior for suppressing the autonomous driving vehicle from performing the unstable behavior based on the unstable behavior information acquired by the information acquisition unit. When the unstable behavior is caused by the driver, the instability suppressing behavior calculation unit may be configured to set a control amount of the instability suppressing behavior in the autonomous driving smaller than that when the unstable behavior is not caused by the driver, or the instability suppressing behavior calculation unit may be configured not to calculate the instability suppressing behavior when the unstable behavior is caused by the driver.

In the information processing system according to the aspect of the present disclosure, the target vehicle data acquisition unit, the behavior occurrence position recognition unit, and the cause determination unit may be configured to be mounted on the target vehicle. The information processing system may be configured to further include a server, and a transmission necessity determination unit configured to be mounted on the target vehicle and to determine whether or not to transmit the unstable behavior information to the server. If it is determined by the cause determination unit that the unstable behavior is caused by the driver, the transmission necessity determination unit may be configured to determine not to transmit the unstable behavior information to the server from the target vehicle.

In the information processing system according to the aspect of the present disclosure, if it is determined by the cause determination unit that the unstable behavior is not caused by the driver, the transmission necessity determination unit may be configured to determine to transmit the unstable behavior information to the server from the target vehicle.

According to another aspect of the present disclosure, there is provided a server configured to include a target vehicle data acquisition unit configured to acquire target vehicle data including a travel state of a target vehicle, driving operation information of the target vehicle, and position information of the target vehicle on a map, a behavior occurrence position recognition unit configured to recognize a behavior occurrence position that is a position where the target vehicle performs an unstable behavior, based on the target vehicle data, a cause determination unit configured to determine whether or not the unstable behavior at the behavior occurrence position is caused by the driver, based on at least one of the travel state of the target vehicle and the driving operation information of the target vehicle, and a memory processing unit configured to associate unstable behavior information relating to the unstable behavior at the behavior occurrence position with the result of determination performed by the cause determination unit, and then, to store the result in a storage database.

According to each aspect of the present disclosure, it is possible to associate the unstable behavior information at the behavior occurrence position where the target vehicle performed the unstable behavior with the result of determination whether or not the unstable behavior is caused by the driver, and then, and store the result.

BRIEF DESCRIPTION OF THE DRAWINGS

FIG. 6A is a flowchart illustrating an example of storage processing for storing the unstable behavior information in an ECU of the target vehicle.

FIG. 6B is a flowchart illustrating an example of transmission necessity determination processing in the ECU of the target vehicle.

FIG. 7A is a flowchart illustrating an example of determination processing whether or not the unstable behavior is caused by a driver cause when the unstable behavior is a slip.

FIG. 7B is a flowchart illustrating another example of the determination processing whether or not the unstable behavior is caused by the driver when the unstable behavior is a slip.

FIG. 7C a flowchart illustrating an example of calculation processing for calculating an instability suppressing behavior by an autonomous driving ECU of the autonomous driving vehicle.

DETAILED DESCRIPTION

Hereinafter, embodiments of the present disclosure will be described with reference to the drawings.

First Embodiment

Figure 1:
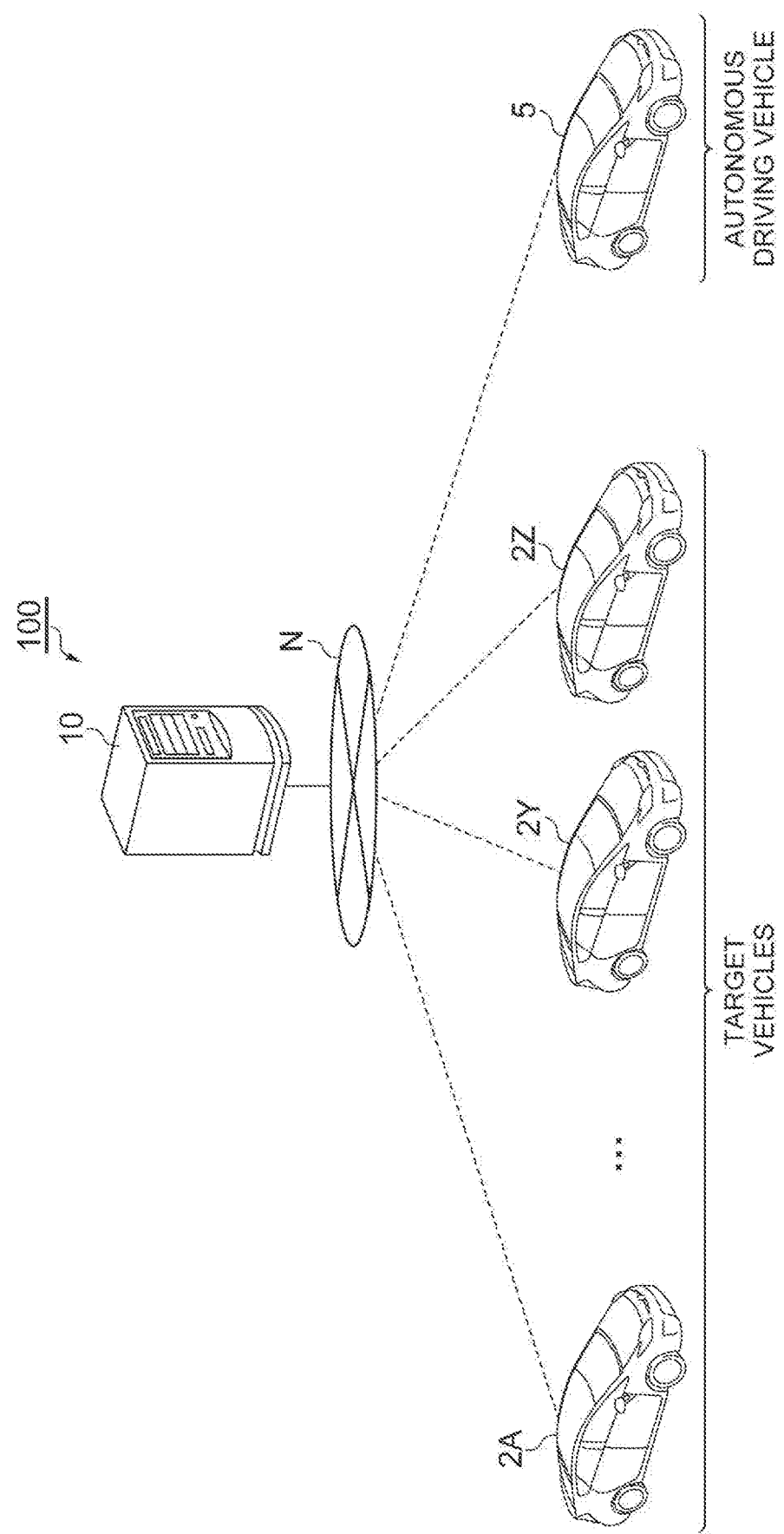
FIG. 1 is a diagram illustrating an information processing system according to the first embodiment.

FIG. 1 is a diagram illustrating an information processing system 100 according to a first embodiment. As illustrated in FIG. 1, in the information processing system 100, target vehicles 2A to 2Z and an autonomous driving vehicle 5 are communicably connected to the server 10 via a network N. The network N is a wireless communication network. The target vehicles 2A to 2Z are vehicles for collecting the information, and the autonomous driving vehicles 5 is a vehicle for which the information is provided.

Figure 2:
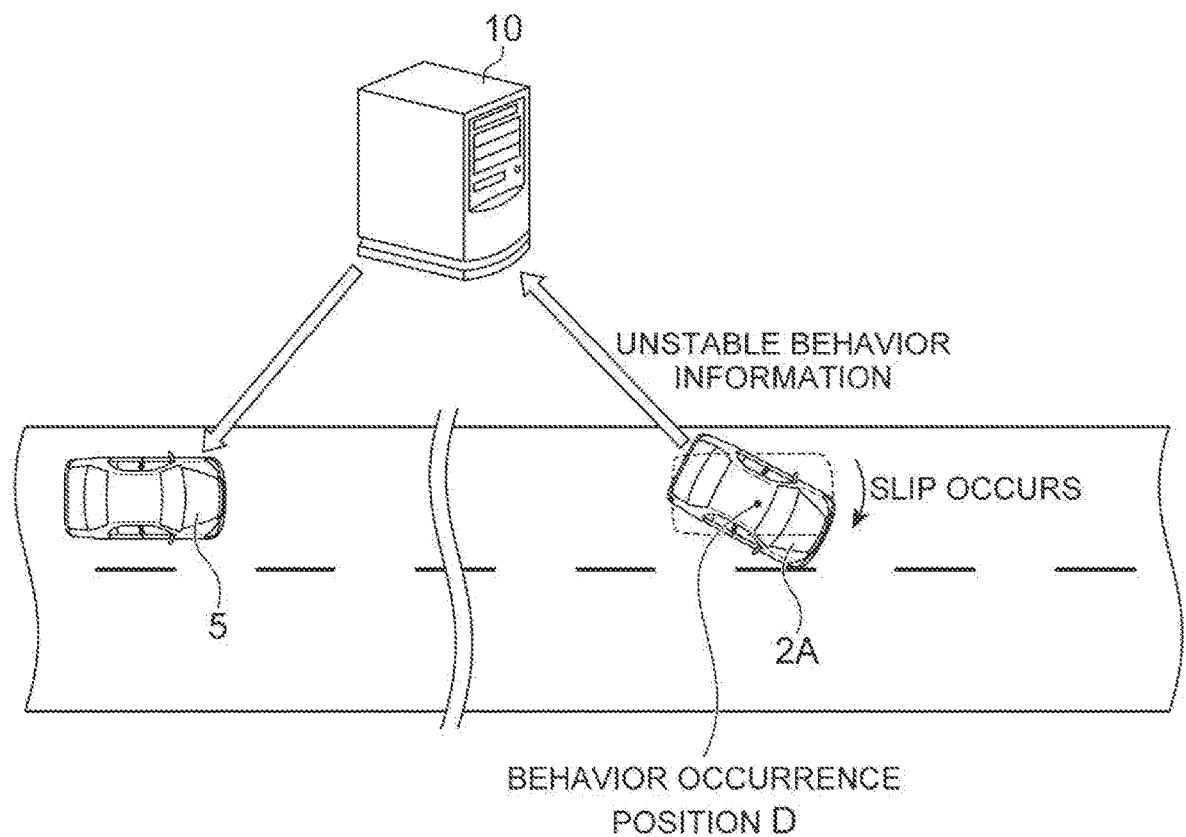
FIG. 2 is a diagram for explaining an example of information processing.

FIG. 2 is a diagram for explaining an example of information processing. As illustrated in FIG. 2, if there occurs a slip on the target vehicle 2A due to road surface freezing or the like, the target vehicle 2A transmits unstable behavior information including a behavior occurrence position D which is a position where the slip has occurred, to the server 10. The server 10 provides, for example, the unstable behavior information to the autonomous driving vehicle 5 traveling behind the target vehicle 2A. In this way, the autonomous driving vehicle 5 can perform the automatic driving so as to suppress the slip of the autonomous driving vehicle 5 at the behavior occurrence position D. Details of the behavior occurrence position and the unstable behavior information will be described later.

Configuration of Information Processing System in First Embodiment

Hereinafter, a configuration of the information processing system 100 according to the first embodiment will be described. As illustrated in FIG. 1, the information processing system 100 according to the first embodiment is configured to include the server 10, at least one ECU electronic control unit (ECU) of the target vehicles 2A to 2Z, and the autonomous driving ECU of the autonomous driving vehicle 5.

Configuration of Server

Figure 3:
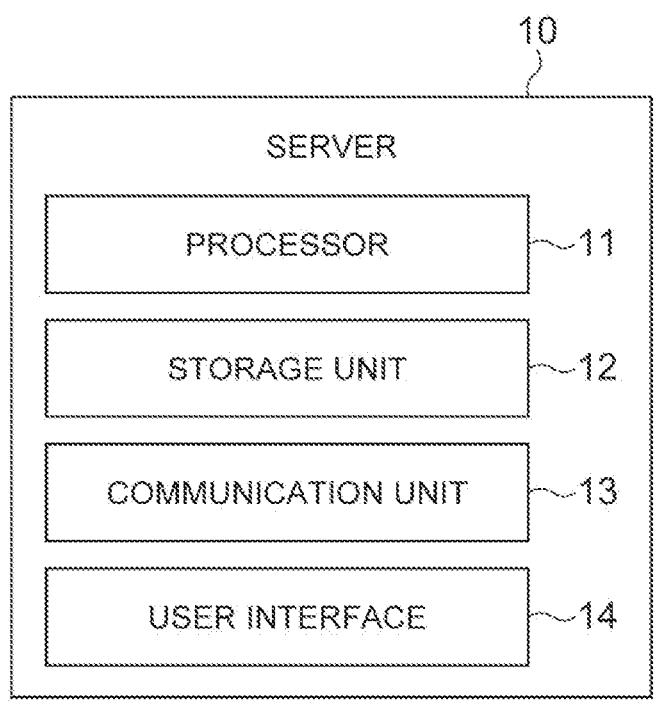
FIG. 3 is a block diagram illustrating an example of a configuration of a server.

The server 10 is provided in a facility such as an information management center, and is configured to be able to communicate with the target vehicles 2A to 2Z and the autonomous driving vehicle 5. FIG. 3 is a block diagram illustrating an example of the configuration of the server 10. The server 10 illustrated in FIG. 3 is configured as a general computer that includes a processor 11, a storage unit 12, a communication unit 13, and a user interface 14.

The processor 11 operates, for example, an operating system to control the server 10. The processor 11 is an arithmetic unit such as a central processing unit (CPU) including a control device, an arithmetic device, a register, and the like. The processor 11 performs overall control of the storage unit 12, the communication unit 13 and the user interface 14. The storage unit 12 is configured to include at least one of a memory and a storage. The memory is a recording medium such as read only memory (ROM) or random access memory (RAM). The storage is a recording medium such as hard disk drive (HDD).

The communication unit 13 is a communication device for performing communication via the network N. For the communication unit 13, a network device, a network controller, a network card, or the like can be used. The user interface 14 is a device including an output device such as a display and a speaker, and an input device such as a touch panel. The server 10 does not necessarily need to be provided in a facility, and may be mounted on a mobile unit such as a vehicle or a ship.

Configuration of Target Vehicle

The target vehicles 2A to 2Z are vehicles that provide data to be used for the information processing by the information processing system 100. ID (identification) information (for example, vehicle identification number) for identifying a vehicle is assigned to the target vehicles 2A to 2Z. The number of the target vehicles may be one. The target vehicles 2A to 2Z do not need to have the same configuration, and may differ from each other in vehicle type and the like. It may be sufficient that the target vehicles 2A to 2Z according to the present embodiment include functional configurations relating to the information processing system 100 (a target vehicle data acquisition unit 31, a behavior occurrence position recognition unit 32, a cause determination unit 33, a memory processing unit 34, and a transmission necessity determination unit 35).

Figure 4:
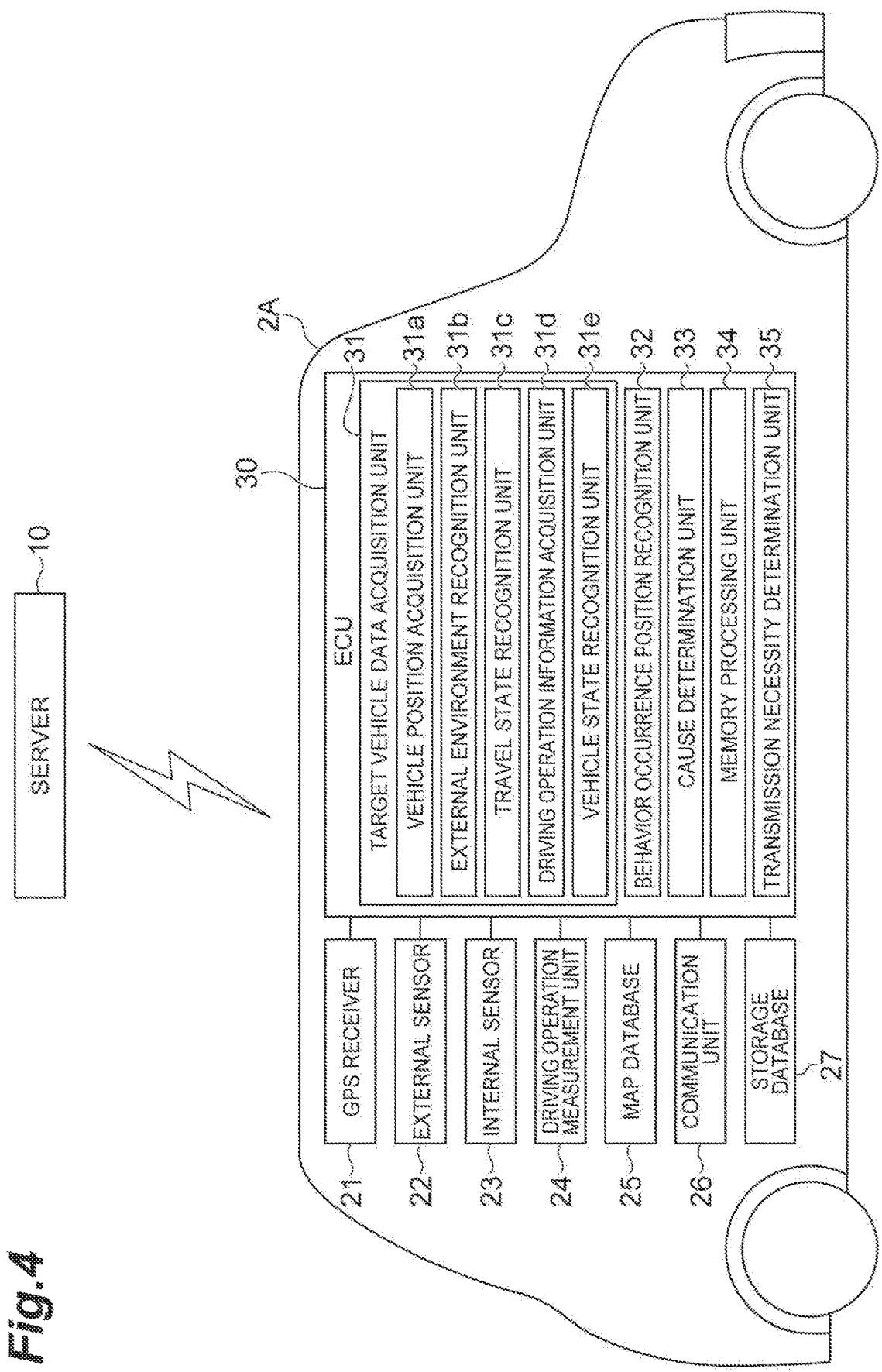
FIG. 4 is a block diagram illustrating an example of a configuration of a target vehicle.

Hereinafter, the target vehicles 2A to 2Z will be described with reference to FIG. 4. FIG. 4 is a block diagram illustrating an example of a configuration of the target vehicle 2A.

As illustrated in FIG. 4, the target vehicle 2A includes an ECU 30. The ECU 30 is an electronic control unit including a CPU, ROM, RAM, and the like. In the ECU 30, for example, various functions are realized by loading a program stored in the ROM into the RAM and executing the program loaded in the RAM by the CPU. The ECU 30 may be configured with a plurality of electronic units.

The ECU 30 is connected to a global positioning system (GPS) receiver 21, an external sensor 22, an internal sensor 23, a driving operation measurement unit 24, a map database 25, a communication unit 26, and a storage database 27.

The GPS receiver 21 measures a position of the target vehicle 2A (for example, the latitude and longitude of the target vehicle 2A) by receiving signals from three or more GPS satellites. The GPS receiver transmits the measured position information (a result of measurement) on the target vehicle 2A to the ECU 30.

The external sensor 22 is a detection device that detects a surrounding situation of the target vehicle 2A. The external sensor 22 includes at least one of a camera and a radar sensor.

The camera is an imaging device that images the external environment of the target vehicle 2A. The camera is provided on the inside of a windshield of the target vehicle 2A, and images the front of the vehicle. The camera transmits the imaging information relating to the external situation of the target vehicle 2A to the ECU 30. The camera may be a monocular camera or may be a stereo camera.

The radar sensor is a detection device that detects objects around the target vehicle 2A using radio waves (for example, millimeter waves) or light. The radar sensor includes, for example, at least one of the millimeter wave radar or a light detection and ranging (LIDAR). The radar sensor transmits the radio wave or light to the surroundings of the target vehicle 2A, and detects the objects by receiving radio waves or light reflected from the objects. The radar sensor transmits the detected object information to the ECU 30. The objects include fixed objects such as guard rails and buildings, as well as moving objects such as pedestrians, bicycles, and other vehicles. The external sensor 22 may include an outside temperature sensor that measures an outside temperature of the target vehicle 2A. The external sensor 22 may include an illuminance sensor that measures a brightness outside the target vehicle 2A.

The internal sensor 23 is a measuring device that measures a state of the target vehicle 2A. The internal sensor 23 includes at least one of a vehicle speed sensor, an accelerator sensor, and a yaw rate sensor as sensors for measuring the travel state of the target vehicle 2A. The vehicle speed sensor is a measuring device that measures a speed of the target vehicle 2A. As the vehicle speed sensor, for example, a vehicle wheel speed sensor can be used, which is provided on vehicle wheels of the target vehicle 2A or on a drive shaft rotating integrally with vehicle wheels, and measures a rotational speed of the vehicle wheels. The vehicle speed sensor transmits the measured vehicle speed information (vehicle wheel speed information) to the ECU 30.

The accelerator sensor is a measuring device that measures an acceleration of the target vehicle 2A. The accelerator sensor includes, for example, a longitudinal accelerator sensor that measures acceleration in the longitudinal direction of the target vehicle 2A. The accelerator sensor may include a lateral accelerator sensor that measures a lateral acceleration of the target vehicle 2A. The accelerator sensor, for example, transmits the acceleration information of the target vehicle 2A to the ECU 30. The yaw rate sensor is a measuring device that measures a yaw rate (rotation angular velocity) around the vertical axis at the center of gravity of the target vehicle 2A. As the yaw rate sensor, for example, a Gyro sensor can be used. The yaw rate sensor transmits the measured yaw rate information of the target vehicle 2A to the ECU 30.

The internal sensor 23 may measure at least one of a tire pressure, a wiper operation state, and a lamp state as the vehicle state of the target vehicle 2A. The tire pressure is a tire pressure of the tires of the target vehicle 2A. The wiper operation state may include not only the wiper operation itself but also the operation speed of the wiper. The lamp state includes a lighting state of direction indicators. The lamp device state may include the presence or absence of lighting of the headlight and the presence or absence of lighting of a fog lamp.

In addition, the internal sensor 23 may measure a brake pressure of a hydraulic brake system using a brake pressure sensor as the vehicle state of the target vehicle 2A, or may detect ON and OFF state of a travel assistance system (for example, a vehicle stability control system to be described later). The internal sensor 23 may measure a load state of each wheel using a wheel load sensor, as the vehicle state of the target vehicle 2A. In addition, the internal sensor 23 may include a failure detection unit that detects various failures of the target vehicle 2A.

The driving operation measurement unit 24 measures an operation of the operation portions of the target vehicle 2A by the driver. The driving operation measurement unit 24 includes, for example, a steering sensor, an accelerator sensor, and a brake sensor. The operation portions of the target vehicle 2A are devices for the driver to input operations to drive the vehicle. The operation portions of the target vehicle 2A include at least one of a steering portion, an accelerator operation portion, and a brake operation portion. The steering portion is, for example, a steering wheel. The steering portion is not limited to a wheel shape, but may be configured to function for steering. The accelerator operation portion is, for example, an accelerator pedal. The brake operation portion is, for example, a brake pedal. The accelerator operation portion and the brake operation portion do not necessarily need to be pedals, and may be configured to input the operation of acceleration or deceleration by the driver.

The steering sensor measures an amount of operation of the steering portion by driver. The amount of operation of the steering portion includes a steering angle. The amount of operation of the steering portion may include a steering torque. The accelerator sensor measures an amount of operation of the accelerator operation portion by the driver. The amount of operation of the accelerator operation portion includes, for example, an amount of depression of the accelerator pedal. The brake sensor measures an amount of operation of the brake operation portion by the driver. The amount of operation of the brake operation portion includes, for example, an amount of depression of the brake pedal. The brake sensor may be configured to measure a master cylinder pressure of the hydraulic brake system. The amount of operation of the accelerator operation portion and the brake operation portion may include a depression speed. The driving operation measurement unit 24 transmits the operation amount information relating to the measured amount of operation by the driver to the ECU 30.

The map database 25 is a database that stores map information. The map database 25 is formed, for example, in a storage device such as a hard disk drive (HDD) mounted on the target vehicle 2A. The map information includes position information, information on a shape of the road (for example, curve information, information on positions of a merge point and a branch. The map information may include traffic regulation information such as a legal speed associated with the position information. The map information may include target object information used for recognizing the position of the target vehicle 2A on the map. The target objects may include lane markings, traffic signals, guard rails, road markings, and the like. The map database 25 may be configured in a server (not limited to the server 10) that can communicate with the target vehicle 2A.

The communication unit 26 is a communication device that controls wireless communication with the outside of the target vehicle 2A. The communication unit 26 transmits and receives various information via the network N. The communication unit 26 transmits various information to the server 10 in response to a signal from the ECU 30.

The storage database 27 is configured, for example, in a storage device such as an HDD mounted on the target vehicle 2A, and stores unstable behavior information on the target vehicle 2A. The unstable behavior information will be described later. The storage database 27 may edit the unstable behavior information in response to the signal from the ECU 30. The storage device is not limited to the HDD. As the storage device, a solid state drive (SSD), an optical disk, a semiconductor memory, a flash memory, or the like may be used.

Next, a functional configuration of the ECU 30 will be described. As illustrated in FIG. 4, the ECU 30 includes the target vehicle data acquisition unit 31, the behavior occurrence position recognition unit 32, the cause determination unit 33, the memory processing unit 34, and the transmission necessity determination unit 35. Some of the functions of the ECU 30 described below may be performed in a server (not limited to the server 10) that can communicate with the target vehicle 2A.

The target vehicle data acquisition unit 31 acquires target vehicle data which is data relating to the target vehicle 2A. The target vehicle data includes, for example, position information of the target vehicle 2A on the map, an external environment of the target vehicle 2A, a travel state of the target vehicle 2A, driving operation information of the target vehicle 2A by the driver, and a vehicle state of the target vehicle 2A.

The target vehicle data acquisition unit 31 includes a vehicle position acquisition unit 31a, an external environment recognition unit 31b, a travel state recognition unit 31c, a driving operation information acquisition unit 31d, and a vehicle state recognition unit 31e.

The vehicle position acquisition unit 31a acquires position information of the target vehicle 2A on the map based on the position information from the GPS receiver 21 and the map information in the map database 25. In addition, the vehicle position acquisition unit 31a may acquire the position information of the target vehicle 2A by a simultaneous localization and mapping (SLAM) technology using the target object information included in the map information in the map database 25 and the result of measurement performed by the external sensor 22. The vehicle position acquisition unit 31a may recognize a lateral position of the target vehicle 2A with respect to the lane (the position of the target vehicle 2A in the lane width direction) from the positional relationship between the marking lines of the lane and the target vehicle 2A, and then, may put the lateral position into the position information. The vehicle position acquisition unit 31a may also acquire the position information of the target vehicle 2A on the map using a known method.

The external environment recognition unit 31b recognizes the external environment of the target vehicle 2A based on the result of measurement performed by the external sensor 22. The external environment includes a relative position between the surrounding object and the target vehicle 2A. The external environment may include a relative speed and a movement direction between the surrounding object and the target vehicle 2A. The external environment may include types of objects such as vehicles, pedestrians, bicycles and the like. The type of object can be identified by known technology such as pattern matching. The external environment may include the result of recognizing the marking lines (recognition of lane lines) around the target vehicle 2A. The external environment may include an ambient temperature and may include the weather.

The travel state recognition unit 31c recognizes a travel state of the target vehicle 2A based on the result of measurement performed by the internal sensor 23. The travel state includes at least one of the vehicle speed of the target vehicle 2A, the acceleration of the target vehicle 2A, and the yaw rate of the target vehicle 2A. Specifically, the travel state recognition unit 31c can recognize the vehicle speed of the target vehicle 2A based on the vehicle speed information from the vehicle speed sensor. The travel state recognition unit 31c can recognize the acceleration of the target vehicle 2A based on the vehicle speed information from the accelerator sensor. The travel state recognition unit 31c can recognize the direction of the target vehicle 2A based on the yaw rate information from the yaw rate sensor.

The driving operation information acquisition unit 31d acquires the driving operation information on the target vehicle 2A based on the result of measurement performed by the driving operation measurement unit 24. The driving operation information includes, for example, at least one of an amount of accelerator operation, an brake operation amount, and an amount of steering by the driver.

In addition, the driving operation information acquisition unit 31d stores a history of driving operation information as a driving operation history in a driver database prepared in advance. The driver database may be integrated in or separate from the storage database 27, or may be formed in a server (not limited to the server 10) that can communicate with the target vehicle 2A.

If the target vehicle 2A has a personal authentication function, the driving operation information acquisition unit 31d stores the driving operation history for each authenticated driver. The external environment of the target vehicle 2A and the travel state may be associated with the driving operation history.

The vehicle state recognition unit 31e recognizes the vehicle state of the target vehicle 2A based on the result of measurement performed by the internal sensor 23. The vehicle state includes, for example, the tire pressure. The vehicle state may include the wiper operation state, the lamp state, and may include the failure state of the target vehicle 2A.

The behavior occurrence position recognition unit 32 recognizes a behavior occurrence position that is a position on the map where the target vehicle 2A performed the unstable behavior, based on the target vehicle data acquired by the target vehicle data acquisition unit 31. The unstable behavior is a behavior of the vehicle that makes the travel of the vehicle unstable. The unstable behavior includes at least a slip. The unstable behavior may include a sudden deceleration or a sudden change of a steering angle. The unstable behavior may include lane departures by the target vehicle 2A, and may include an excessive approach to the objects by the target vehicle 2A.

First, a determination of the unstable behavior will be described. The behavior occurrence position recognition unit 32 determines whether or not the target vehicle 2A performed the unstable behavior based on the target vehicle data. The behavior occurrence position recognition unit 32 determines that the target vehicle 2A has slipped based on at least one of, for example, the acceleration measured by the accelerator sensor (the longitudinal acceleration and the lateral acceleration), the vehicle wheel speed of each wheel measured by the vehicle wheel speed sensor, the yaw rate measured by the yaw rate sensor, the steering angle by the driver measured by the steering sensor, the brake operation amount measured by the brake sensor, and the brake pressure measured by the brake pressure sensor. Instead of the brake operation amount measured by the brake sensor, the master cylinder pressure of the hydraulic brake system may be used.

The behavior occurrence position recognition unit 32 may use an operation start condition of a well-known antilock brake system (ABS) for the determination of occurrence of the slip. As an example, the antilock brake system starts the operation when the wheel considered to be locked is identified after comparing the vehicle wheel speed of each wheel with the estimated vehicle body speed. The estimated vehicle body speed may be obtained from the vehicle wheel speed of each wheel before the slip, or may be obtained from the change in acceleration before the slip.

In addition, the behavior occurrence position recognition unit 32 may use an operation start condition of a well-known vehicle stability control (VSC) system, or may use an operation start condition of a well-known traction control (TRC) system, as the determination of occurrence of the slip. The traction control can also be activated when idle wheels are identified by comparing the vehicle wheel speed of each wheel with the estimated vehicle body speed. The behavior occurrence position recognition unit 32 may determine the occurrence of the slip on the target vehicle 2A according to other known methods.

The behavior occurrence position recognition unit 32 may determine whether or not the target vehicle 2A suddenly decelerated based on the deceleration measured by the accelerator sensor, as an unstable behavior. In this case, for example, when an absolute value of the deceleration becomes greater than a sudden deceleration threshold value, the behavior occurrence position recognition unit 32 determines that the target vehicle 2A is suddenly decelerated. The sudden deceleration threshold value is a threshold value having a value set in advance.

The behavior occurrence position recognition unit 32 may determine whether or not a sudden change of the steering angle occurred in the target vehicle 2A based on the yaw rate measured by yaw rate sensor, as an unstable behavior. In this case, for example, when the yaw rate becomes equal to or higher than a steering angle change threshold value, the behavior occurrence position recognition unit 32 determines that the sudden change of the steering angle occurred in the target vehicle 2A. The steering angle change threshold value is a threshold value having a value set in advance. A tire turning angle may be used instead of the yaw rate.

If the direction indicators are not turned on, the behavior occurrence position recognition unit 32 may determine whether or not the target vehicle 2A has departed from the lane based on the lateral position of the target vehicle 2A or the external environment of the target vehicle 2A, as an unstable behavior. In this case, the behavior occurrence position recognition unit 32 determines the lane departure based on the lateral position of the target vehicle 2A, for example. Alternatively, the behavior occurrence position recognition unit 32 may determine the lane departure when it is recognized from the external environment of the target vehicle 2A that the target vehicle 2A crossed the lane line.

The behavior occurrence position recognition unit 32 may determine whether or not the target vehicle 2A excessively approaches an object based on the travel state of the target vehicle 2A and the external environment of the target vehicle 2A, as the unstable behavior. In this case, if the vehicle speed of the target vehicle 2A is equal to or higher than a vehicle speed threshold value and a time to collision (TTC) between the target vehicle 2A and the object is shorter than a TTC threshold value, because the unstable behavior does not occur when the target vehicle 2A is slow even if the distance to the object is short, the behavior occurrence position recognition unit 32 determines that the target vehicle 2A does not excessively approach the object. Instead of the time to collision, a time headway (THW) or a distance may be used. The TTC threshold value is a threshold value having a value set in advance.

Whether or not the target vehicle 2A performed the unstable behavior may be determined each time the target vehicle data is acquired, or may be collectively performed at a fixed time or for a fixed period. Whether or not the target vehicle 2A performed the unstable behavior may be determined while the target vehicle 2A is stopped.

Next, the recognition of the behavior occurrence position will be described. The behavior occurrence position is a position of the target vehicle 2A on the map where the target vehicle 2A performed an unstable behavior. If it is determined that the target vehicle 2A performed the unstable behavior, the behavior occurrence position recognition unit 32 recognizes the behavior occurrence position.

The behavior occurrence position recognition recognizes the behavior occurrence position based on the position information of the target vehicle 2A on the map when it is determined that the target vehicle 2A performed the unstable behavior. The behavior occurrence position is separately recognized for each lane. If the unstable behavior is a lane departure, the behavior occurrence position may be a position in the traveling lane before the lane departure, or may be a position on the marking line.

The behavior occurrence position may be recognized as a section, not a point on the map. If the target vehicle 2A slides while slipping, the behavior occurrence position recognition unit 32 may also set the slip start position as the behavior occurrence position, or may recognize all the section where the target vehicle 2A moves in a state of being determined to be slipping, as the behavior occurrence position. The same is applicable to other unstable behaviors.

If the behavior occurrence position is recognized by the behavior occurrence position recognition unit 32, the cause determination unit 33 determines a cause of the unstable behavior at the behavior occurrence position. The cause determination, unit 33 determines at least the driver cause and the vehicle cause as the cause of the unstable behavior. The driver cause means that the driver's operation is a main cause of performing the unstable behavior. The vehicle cause means that the vehicle state is a main cause of performing the unstable behavior.

First, the determination of the driver cause by the cause determination unit 33 will be described. The cause determination unit 33 determines whether or not the unstable behavior is caused by the driver based on at least one of the travel state of the target vehicle 2A and the driving operation information on the target vehicle 2A. The content of the determination of driver cause is changed according to the content of the unstable behavior.

For example, if it is determined that the target vehicle 2A has slipped, when the acceleration of the target vehicle 2A driven by the driver at the time of slip determination is equal to or greater than an acceleration threshold value, the cause determination unit 33 determines that the slip is caused by the driver. The acceleration threshold value is a threshold having a value set in advance. The acceleration threshold value may be, for example, 0.15 G.

If it is determined that the target vehicle 2A has slipped, when the vehicle speed of the target vehicle 2A driven by driver at the time of slip determination is equal to or higher than the vehicle speed threshold value, the cause determination unit 33 may determine that the slip is caused by the driver. The vehicle speed threshold value is a threshold value having a value set in advance. The vehicle speed threshold value may be, for example, a legal speed in the traveling lane in which the target vehicle 2A travels.

If it is determined that the target vehicle 2A has slipped, when an increase of the vehicle speed of the target vehicle 2A during slip determination is equal to or greater than a vehicle speed increase threshold value, the cause determination unit 33 may determine that the slip is caused by the driver. During the slip determination means that the determination that the target vehicle 2A has slipped is continuing. The increase of the vehicle speed is, for example, an absolute value of a difference between the vehicle speed at the start of slipping and a maximum value of the vehicle speed during the slip determination. The vehicle speed increase threshold value is a threshold value having a value set in advance. The vehicle speed increase threshold value may be, for example, 0.55 km/h. It is not necessary for the driver to drive during the slip determination.

If it is determined that the target vehicle 2A has slipped, when the amount of accelerator operation of the target vehicle 2A at the time of slip determination is equal to or greater than an accelerator threshold value based on the acceleration amount performed by the driver measured by the accelerator sensor, the cause determination unit 33 may determine that the slip is caused by the driver. The accelerator threshold value is a threshold value having a value set in advance. The cause determination unit 33 may perform the determination using a maximum value of the acceleration amount performed by the driver in a certain period up to the slip determination.

If it is determined that the target vehicle 2A has slipped, when the brake operation amount of the target vehicle 2A at the slip determination is equal to or greater than a brake threshold value based on an brake operation amount performed by the driver measured by the brake sensor, the cause determination unit 33 may determine that the slip is caused by the driver. The brake threshold value is a threshold value having a value set in advance. Instead of the brake operation amount, the master cylinder pressure of the hydraulic brake system may be used. The brake threshold value in this case is also a threshold value having a value set in advance. The brake threshold value can be, for example, 1.77 MPa. The cause determination unit 33 may perform the determination using a maximum value of the brake operation amount performed by the driver in a certain period up to the slip determination.

If it is determined that the target vehicle 2A has slipped, when a steering angle of the target vehicle 2A at the time of slip determination is equal to or greater than a steering angle threshold value based on the steering angle by the driver measured by the steering sensor, the cause determination unit 33 may determine that the slip is caused by the driver. The steering angle threshold value is a threshold value having a value set in advance. The steering angle threshold value can be, for example, 1.80 deg. The cause determination unit 33 may perform the determination using a maximum value of the steering angle performed by the driver in a certain period up to the slip determination. The cause determination unit 33 may perform the determination using a steering angle speed instead of the steering angle. In this case, a steering angle speed threshold value is used instead of the steering angle threshold value. The steering angle speed threshold value is also a threshold value having a value set in advance, and can be, for example, 75 deg/s.

The cause determination unit 33 may determine the cause of the unstable behavior based on both the travel state of the target vehicle 2A and the driving operation information on the target vehicle 2A. Specifically, if it is determined that the target vehicle 2A has slipped, when the vehicle speed of the target vehicle 2A is equal to or higher than the vehicle speed threshold value and the brake operation amount performed by the driver is equal to or greater than the brake threshold value, the cause determination unit 33 may determine that the slip is caused by the driver. In this case, when the vehicle speed of the target vehicle 2A is lower than the vehicle seed threshold value or the brake operation amount performed by the driver is less than the brake threshold value, the cause determination unit 33 may determine that the cause of the slip is not the driver.

If it is determined that the target vehicle 2A has slipped, when the vehicle speed of the target vehicle 2A is equal to or higher than the vehicle speed threshold value and the steering angle of the target vehicle 2A at the time of slip determination is equal to or greater than the steering angle threshold value, the cause deter urination unit 33 may determine that the slip is caused by the driver. In this case, when the vehicle speed of the target vehicle 2A is lower than the vehicle speed threshold value or the steering angle performed by the driver is less than the steering angle threshold value, the cause determination unit 33 may determine that the cause of the slip is not the driver. The determination may be performed using the steering angle speed instead of the steering angle.

In addition, if it is determined that the target vehicle 2A has slipped, when an operation time of an anti-lock brake system or a vehicle stability control system of the target vehicle 2A is shorter than an operation time threshold value, the cause determination unit 33 may determine that the slip is caused by an unexpected situation. The operation time threshold value is a threshold value having a value set in advance. When operation time of the anti-lock brake system (the time determined that the target vehicle 2A has slipped) is abnormally short, because it is considered that the possibility that the slip is caused by an unexpected situation (such as a cross wind at an exit of a tunnel) is high, it may be determined that the slip is caused by the unexpected situation. In this case, a result determination performed by the cause determination unit 33 may not be stored in the storage database 27. The result of determination performed by the cause determination unit 33 may be stored in the storage database 27.

The cause determination unit 33 may change each threshold value based on the external environment of the target vehicle 2A. If the outside temperature of target vehicle 2A is lower than a freezing threshold value, since the possibility that the slip occurs due to the road surface freezing or the like instead of the driver cause, the cause determination unit 33 may change each threshold value so as not to be determined as a driver cause. The freezing threshold value is a threshold value having a value set in advance. For example, if the outside temperature of the target vehicle 2A is lower than the freezing threshold value, the cause determination unit 33 may change at least one of the acceleration threshold, the vehicle speed threshold value, the vehicle speed increase threshold value, the accelerator threshold value, the brake threshold value, and the steering angle threshold value to a large value compared to a case where the outside temperature is higher than the freezing threshold value.

Similarly, when a weather outside the target vehicle 2A is rainy or snowy, the cause determination unit 33 may change the acceleration threshold value or the like to a large value compared to a case where the weather is not rainy (for example, in a case of fine weather). Whether or not the weather is rainy can be determined, for example, from a windshield wiper operation state or the imaging information from the camera. In addition, when the weather outside the target vehicle 2A is heavy rain, the cause determination unit 33 may change the acceleration threshold or the like to a large value compared to a case where the weather is not heavy rain. The heavy rain weather can be determined, for example, when the windshield wiper operation speed is a speed corresponding to the heavy rain. The heavy rain weather can be determined from the imaging information from the camera. The heavy rain weather can be acquired from the communication network.

If it is determined that a sudden deceleration of target vehicle 2A has occurred as an unstable behavior, the cause determination unit 33 may determine whether the sudden deceleration is caused by the driver based on a driving operation tendency of the driver. In this case, the cause determination unit 33 may recognize the driving operation tendency of the driver from the driving operation history stored in the driver database.

If a frequency of sudden brake operation is equal to or greater than a sudden brake frequency threshold value, the cause determination unit 33 may determine that the sudden deceleration is caused by the driver, as the driving operation tendency by the driver. The sudden brake frequency threshold value is a threshold value having a value set in advance. The sudden brake operation can be determined from the brake operation amount (or the master cylinder pressure) by the driver measured by the brake sensor. The frequency is the number of times in a certain period. A certain period is not particularly limited, and may be several hours, one day, or one week.

If a sudden change of the steering angle of target vehicle 2A is determined as the unstable behavior, the cause determination unit 33 may determine whether the sudden change of the steering angle is caused by the driver or not based on the driving operation tendency of the driver. If a frequency of sudden steering as a driving operation tendency of the driver is equal to or greater than a sudden steering frequency threshold value, the cause determination unit 33 determines that the sudden change of steering angle is caused by the driver. The sudden steering frequency threshold value is a threshold value having a value set in advance. The sudden steering can be determined from the steering angle by the driver measured by the steering sensor.

If it is determined that the target vehicle 2A is departed from the lane as the unstable behavior, the cause determination unit 33 may determine whether the lane departure is a driver cause or not based on the driving operation tendency of the driver. If a frequency of lane departure by the driver is equal to or greater than a lane departure frequency threshold value, the cause determination unit 33 determines that the lane departure is caused by the driver. The lane departure frequency threshold value is a threshold value having a value set in advance.

If it is determined that the target vehicle 2A excessively approaches an object as the unstable behavior, the cause determination unit 33 may determine whether the excessive approach to the object is a driver cause or not based on the driving operation tendency of the driver. If a frequency of the excess approach to the object by the driver is equal to or greater than an excessive approach frequency threshold value, the cause determination unit 33 determines that the excessive approach to the object is caused by the driver. The excessive approach frequency threshold value is a threshold value having a value set in advance.

Next, the vehicle cause determination by the cause determination unit 33 will be described. The cause determination unit 33 determines whether the unstable behavior is caused by a vehicle cause or not based on the vehicle state of the target vehicle 2A.

If it is determined that the target vehicle 2A has slipped, the cause determination unit 33 determines whether the slip is caused by the vehicle or not based on the vehicle state of the target vehicle 2A. For example, when the tire pressure of any vehicle of target vehicle 2A is lower than a tire pressure threshold value, the cause determination unit 33 determines that the slip is caused by the vehicle. The tire pressure threshold value is a threshold value having a value set in advance. For example, The tire pressure threshold value can be 46 kpa.

When the vehicle stability control system (VSC) is turned off by the driver's operation, the cause determination unit 33 may determine that the slip is caused by the vehicle. An anti-lock brake system (ABS) or a traction control (TRC) may be used instead of the vehicle stability control system (VSC). Alternatively, when any one of the vehicle stability control system (VSC), the anti-lock brake system (ABS), and the traction control (TRC) is turned off, the cause determination unit 33 may determine that the slip is caused by the vehicle.

If it is determined that the target vehicle 2A has slipped, and when a load condition of each wheel of target vehicle 2A is unbalanced, the cause determination unit 33 may determine that the slip is caused by the vehicle. The unbalance of the load state of the vehicle wheels means, for example, means a case where a load difference between the vehicle wheels (the load difference between the maximum loaded vehicle wheel and the minimum loaded vehicle wheel) is equal to or greater than a load threshold value. The load threshold value is a threshold value having a value set in advance.

The cause determination unit 33 may have vehicle specification data such as a size of the vehicle body of the target vehicle 2A, as the vehicle state of the target vehicle 2A. For example, if it is determined that the target vehicle 2A has slipped, and if the target vehicle 2A is a small vehicle and the vehicle speed of the target vehicle 2A is lower than the vehicle speed threshold value and equal to or higher than a small vehicle speed threshold value, since it is considered that the slip has occurred not because of the driver's operation but because the target vehicle 2A is a small vehicle having low resistance to the high-speed travel, the cause determination unit 33 may determine that the slip is caused by the vehicle. The small vehicle speed threshold value is a threshold value having a value set in advance, and is a threshold value smaller than the vehicle speed threshold value.

If it is determined that the target vehicle 2A performed the unstable behavior, and when a failure of the target vehicle 2A (a failure having a significant impact on the travel) is detected, the cause determination unit 33 may determine that the unstable behavior is caused by the vehicle. The failure having a significant impact on the travel is, for example, a failure of a steering system, a failure of a travel control function, or the like.

If the condition of determination that the unstable behavior is caused by the vehicle is satisfied even if the condition of determination that the unstable behavior is caused by the driver is satisfied, the cause determination unit 33 may determine that the unstable behavior is caused by the vehicle.

If the unstable behaviors determined to be caused by neither the driver nor the vehicle are repeated at the same behavior occurrence position, and if the number of repetitions of such unstable behavior is equal to or greater than a number of repetitions threshold value, the cause determination unit 33 may determine that the unstable behaviors at the behavior occurrence position are caused by the position cause.

If the cause determination unit 33 determines the cause of the unstable behavior, the memory processing unit 34 stores the result of determination performed by the cause determination unit 33 in the storage database 27 in association with the unstable behavior information. Not only when it is determined by the cause determination unit 33 that the unstable behavior is caused by the driver or the vehicle, but also when it is determined that the unstable behavior is caused by neither the driver nor the vehicle, the memory processing unit 34 stores the result of determination in the storage database 27 in association with the unstable behavior information.

The unstable behavior information is information relating to the unstable behavior at the behavior occurrence position. The unstable behavior information includes at least the behavior occurrence position and the content of the unstable behavior (such as slip). The unstable behavior information may include at least a part of the vehicle specification data of the target vehicle 2A (category of a large vehicle, a small vehicle, or the like). In addition, the unstable behavior information may include the external environment of the target vehicle 2A at the time when the unstable behavior occurs, or may include the travel state of the target vehicle 2A at the time when the unstable behavior occurs. The external environment of the target vehicle 2A may include the outside temperature of the target vehicle 2A, and may include the weather outside the target vehicle 2A. The unstable behavior information may include the vehicle state of the target vehicle 2A at the time when the unstable behavior occurs.

If it is determined by the cause determination unit 33 that the unstable behavior is caused by the driver, the memory processing unit 34 stores the unstable behavior information in the storage database 27 in association with the result of determination (the driver cause) performed by the cause determination unit 33. If it is determined by the cause determination unit 33 that the unstable behavior is caused by the vehicle, the memory processing unit 34 stores the unstable behavior information in the storage database 27 in association with the result of determination (the vehicle cause) performed by the cause determination unit 33. If it is determined by the cause determination unit 33 that the unstable behavior is caused by the position cause, the memory processing unit 34 stores the unstable behavior information in the storage database 27 in association with the result of determination (the position cause) performed by the cause determination unit 33.

The transmission necessity determination unit 35 determines whether or not to transmit the unstable behavior information to the server 10. If it is determined by the cause determination unit 33 that the unstable behavior is not caused by the driver, the transmission necessity determination unit 35 determines to transmit the unstable behavior information to the server 10 from the target vehicle 2A. In this case, the transmission necessity determination unit 35 may transmit the unstable behavior information together with the result of determination of the associated cause of unstable behavior (for example, the result of determination that the unstable behavior is not caused by the driver). The transmission necessity determination unit 35 transmits the unstable behavior information to the server 10 through the communication unit 26.

If it is determined by the cause determination unit 33 that the unstable behavior is caused by the driver, the transmission necessity determination unit 35 determines not to transmit the unstable behavior information to the server 10 from the target vehicle 2A. In this way, the transmission necessity determination unit 35 can suppress the information relating to the unstable behavior that cannot be said to have a high possibility of meeting with other vehicles from being transmitted to the server 10.

Even if it is determined by the cause determination unit 33 that the unstable behavior is caused by the vehicle, the transmission necessity determination unit 35 may determine not to transmit the unstable behavior information to the server 10 from the target vehicle 2A. In this case also, the transmission necessity determination unit 35 can suppress the information relating to the unstable behavior caused by the vehicle state of the target vehicle 2A that cannot be said to have a high possibility of meeting with other vehicles from being transmitted to the server 10.

Configuration of Autonomous Driving Vehicle

The autonomous driving vehicle 5 is a vehicle for which the information is provided in the information processing system 100. ID information (for example, a vehicle identification number) for identifying a vehicle is assigned to the autonomous driving vehicle 5. The number of autonomous driving vehicles 5 is not limited to one, and may be plural. The plurality of autonomous driving vehicles 5 does not need to be vehicles having the same configurations, and may be of different vehicle types. It may be sufficient as long as the autonomous driving vehicle 5 according to the present embodiment may have an autonomous driving function, and may have a functional configuration (an information acquisition unit 64 and an instability suppressing behavior calculation unit 65 described later) in the information processing system 100.

Figure 5:
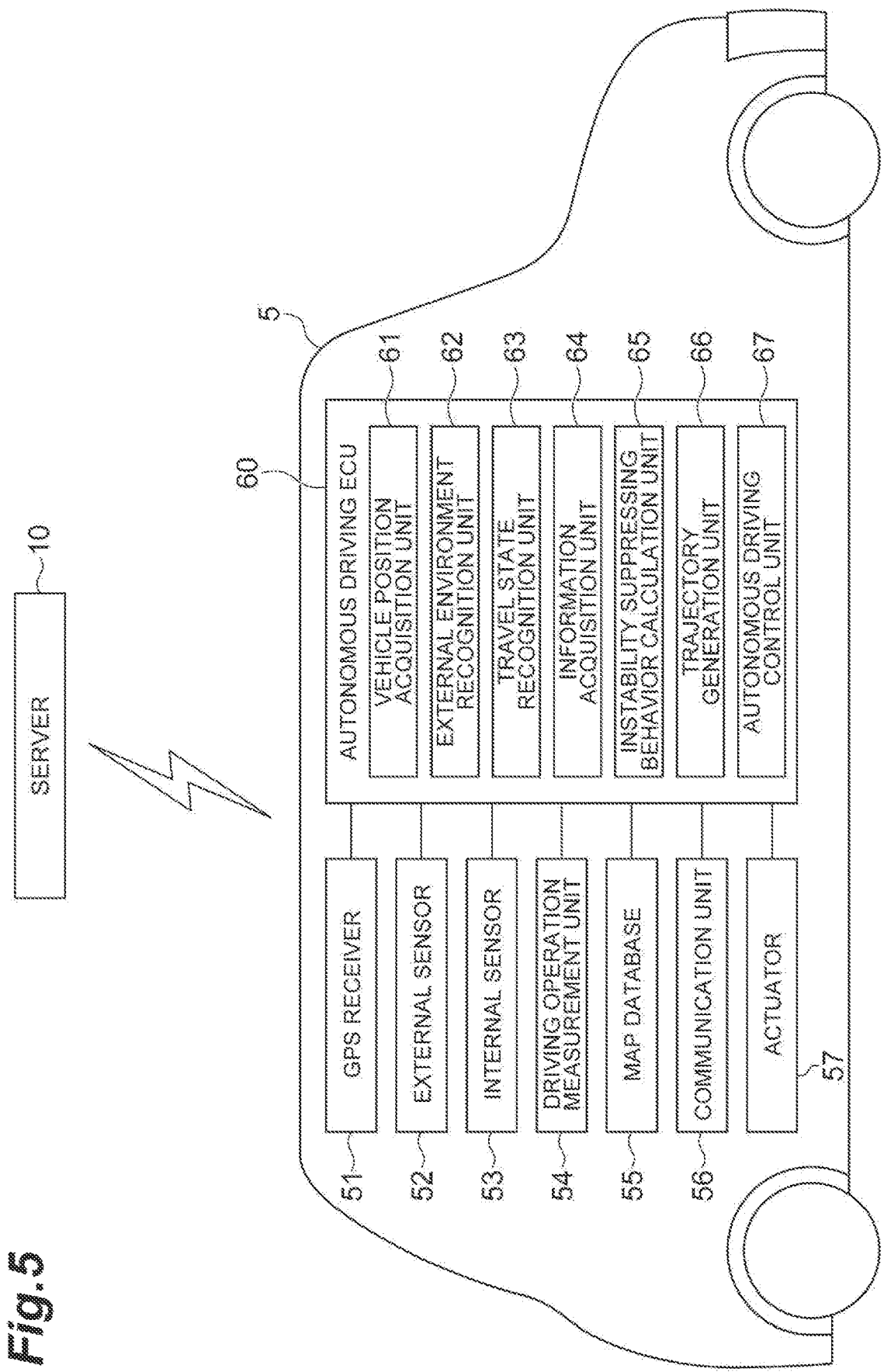
FIG. 5 is a block diagram illustrating an example of a configuration of an autonomous driving vehicle.

Hereinafter, the autonomous driving vehicle 5 will be described with reference to FIG. 5. FIG. 5 is a block diagram illustrating an example of a configuration of the autonomous driving vehicle 5. The autonomous driving is a vehicle control that causes the autonomous driving vehicle 5 to autonomously travel toward a destination set in advance. In the autonomous driving, the driver does not need to perform the driving operation, and autonomous driving vehicle 5 travels autonomously.

As illustrated in FIG. 5, the autonomous driving vehicle 5 includes an autonomous driving ECU 60. The autonomous driving ECU 60 is an electronic control unit including a CPU, ROM, RAM, and the like. In the autonomous driving ECU 60, for example, various functions are realized by loading a program stored in the ROM into the RAM and executing the program loaded in the RAM by the CPU. The autonomous driving ECU 60 may be configured with a plurality of electronic units.

The autonomous driving ECU 60 is connected to a global positioning system (GPS) receiver 51, an external sensor 52, an internal sensor 53, a driving operation measurement unit 54, a map database 55, a communication unit 56, and an actuator 57.

The GPS receiver 51, the external sensor 52, the internal sensor 53, the driving operation measurement unit 54, the map database 55, and the communication unit 56 can be configured similar to the GPS receiver 21, the external sensor 22, the internal sensor 23, the driving operation measurement unit 24, the map database 25, and the communication unit 26 in target vehicle 2A, respectively, and the detailed description thereof will be omitted. If the autonomous driving vehicle 5 is a vehicle for fully autonomous driving, the driving operation measurement unit 54 does not necessarily need to be mounted. In addition, it is assumed that the map database 55 has map information with an accuracy that can perform the autonomous driving.

The actuator 57 is a device used for controlling the autonomous driving vehicle 5. The actuator 57 includes at least a drive actuator, a brake actuator and a steering actuator. The drive actuator controls a driving force of the autonomous driving vehicle 5 by controlling an amount of air (throttle opening degree) supplied to the engine according to a control signal from the autonomous driving ECU 60. If the autonomous driving vehicle 5 is a hybrid vehicle, in addition to the amount of air supplied to the engine, the control signal from the autonomous driving ECU 60 is input to a motor as a power source, and the driving force is controlled. If the autonomous driving vehicle 5 is an electric vehicle, the control signal from the autonomous driving ECU 60 is input to a motor as a power source, and the driving force is controlled. The motor as the power source in these cases configures the actuator 57.

The brake actuator controls the brake system according to the control signal from the autonomous driving ECU 60 and controls a braking force applied to the wheels of the autonomous driving vehicle 5. For example, a hydraulic brake system can be used as the brake system. The steering actuator controls the driving of an assist motor controlling a steering torque of an electric power steering system according to the control signal from the autonomous driving ECU 60. As a result, the steering actuator controls the steering torque of the autonomous driving vehicle 5.

Next, a functional configuration of the autonomous driving ECU 60 will be described. The autonomous driving ECU 60 includes a vehicle position acquisition unit 61, an external environment recognition unit 62, a travel state recognition unit 63, an information acquisition unit 64, an instability suppressing behavior calculation unit 65, a trajectory generation unit 66, and an autonomous driving control unit 67. A part of the functions of the autonomous driving ECU 60 described above may be performed by a server (not limited to the server 10) capable of communicating with the autonomous driving vehicle 5.

The vehicle position acquisition unit 61, the external environment recognition unit 62, and the travel state recognition unit 63 can be respectively configured similar to the vehicle position acquisition unit 31a, the external environment recognition unit 31b, and the travel state recognition unit 31c of target vehicle 2A illustrated in FIG. 4, and the detailed description thereof will be omitted.

The information acquisition unit 64 acquires unstable behavior information from the server 10 through the communication unit 56. The information acquisition unit 64 acquires the unstable behavior information according to the behavior occurrence position existing on the traveling route for autonomous driving based on the traveling route for the autonomous driving set in advance in the autonomous driving vehicle 5 and the unstable behavior information (the unstable behavior information stored in the storage database 27 at least once).

The information acquisition unit 64 extracts the unstable behavior information according to the behavior occurrence position existing on the traveling route for the autonomous driving vehicle 5 from the server 10 by, for example, transmitting the traveling route for autonomous driving vehicle 5 to the server 10. The information acquisition unit 64 acquires the unstable behavior information by receiving the unstable behavior information according to the behavior occurrence position existing on the traveling route from the server 10. The information acquisition unit 64 itself may acquire the unstable behavior information according to the behavior occurrence position existing on the traveling route of the autonomous driving vehicle 5 from the from the unstable behavior information transmitted from the server 10.

The instability suppressing behavior calculation unit 65 calculates an instability suppressing behavior based on the unstable behavior information acquired by the information acquisition unit 64. The instability suppressing behavior is a behavior to suppress the autonomous driving vehicle 5 from performing the unstable behavior. The instability suppressing behavior includes, for example, a vehicle speed suppression and a steering suppression, and the like of the autonomous driving vehicle 5. The vehicle speed suppression means suppressing the speed of autonomous driving to avoid the unstable behavior such as a slip. The steering suppression means traveling along the edge of the lane to avoid the behavior occurrence position. The steering suppression may include an aspect in which a part of the autonomous driving vehicle 5 temporarily deviates from the lane. If there is an adjacent lane for traveling parallel to the lane where the behavior occurrence position is located, the instability suppressing behavior may include the lane changes.

For example, if the unstable behavior is a slip, the instability suppressing behavior calculation unit 65 calculates the vehicle speed suppression of the autonomous driving vehicle 5 as the instability suppressing behavior. As an example, the instability suppressing behavior calculation unit 65 calculates the vehicle speed suppression that performs deceleration when approaching the behavior occurrence position. Alternatively, the instability suppressing behavior calculation unit 65 may calculate the vehicle speed suppression that changes an upper limit of the vehicle speed for the autonomous driving to a lower value compared to the normal autonomous driving, when approaching the behavior occurrence position.

For example, if the unstable behavior is a slip and the behavior occurrence position exists at the right side of the lane, the instability suppressing behavior calculation unit 65 calculates the steering suppression of the autonomous driving vehicle 5, as the instability suppressing behavior. As an example, the instability suppressing behavior calculation unit 65 calculates a steering suppression that pushes the autonomous driving vehicle 5 to the left side of the lane so as to avoid the behavior occurrence position.

The determination whether or not the autonomous driving vehicle 5 approaches the behavior occurrence position may be performed based on a distance between the autonomous driving vehicle 5 and the behavior occurrence position, or may be performed based on an arrival remaining time for the autonomous driving vehicle 5 to the behavior occurrence position.

The trajectory generation unit 66 generates a trajectory to be used for the autonomous driving of the autonomous driving vehicle 5. Trajectory generation unit 66 generates trajectory for the autonomous driving based on the traveling route set in advance, the map information, the position of the autonomous driving vehicle 5 on the map, the external environment of autonomous driving vehicle 5, and the travel state of autonomous driving vehicle 5.

The traveling route is a route on which the autonomous driving vehicle 5 travels by the autonomous driving. The trajectory generation unit 66 obtains a traveling route for the autonomous driving based on, for example, the destination, the map information, and the position of the autonomous driving vehicle 5 on the map. The traveling route may be set by a known navigation system. The destination may be set by the occupant of the autonomous driving vehicle 5, or may be automatically proposed by the autonomous driving ECU 60 or the navigation system.

The trajectory includes a path on which the vehicle travels by autonomous driving and a vehicle speed profile in the autonomous driving. The path is a trace of the vehicle traveling by the autonomous driving on the traveling route. The path can be, for example, data of the steering angle change (steering angle profile) of the autonomous driving vehicle 5 according to the position on the traveling route. The position on the traveling route is, for example, a set vertical position set for each predetermined interval (for example, 1 m) in the traveling direction of the traveling route. The steering angle profile is data in which a target steering angle is associated with each set vertical position.

The trajectory generation unit 66 generates the path on which the vehicle travels, based on, for example, the traveling route, the map information, the external environment of the autonomous driving vehicle 5, and the travel state of the autonomous driving vehicle 5. The trajectory generation unit 66 generates the path such that, for example, the autonomous driving vehicle 5 passes through the center (the center in the lane width direction) of the lane included in the traveling route.

Instead of the steering angle profile, a steering torque profile may be used, in which a target steering torque is associated with each set vertical position. In addition, instead of the steering angle profile, a lateral position profile may be used, in which a target lateral position is associated with each set vertical position. The target lateral position is a position of the target in the width direction of the lane. In this case, the set vertical position and the target lateral position may be set together as one position coordinate.

A vehicle speed profile is, for example, data in which the target vehicle speed is associated with each set vertical position. The set vertical position may be set based on the traveling time of the vehicle rather than the distance. The set vertical position may be set as an arrival position of the vehicle after one second, or an arrival position of the vehicle after two seconds. The set vertical position may be set using a road marking or the like included in the map information. The road marking in this case may include at least one of a marking line (including a dashed marking line), a stop line, an arrow in the traveling direction of the lane, and the like.

The trajectory generation unit 66 generates the vehicle speed profile based on the path and the speed-related information such as the legal speed included in the map information. Instead of the legal speed, the speed set in advance for the position or section on the map may be used. The trajectory generation unit 66 generates the trajectory for the autonomous driving from the path and the vehicle speed profile. The method of generating the trajectory by the trajectory generation unit 66 is not limited to the description above, and other known methods can be adopted.

The trajectory generation unit 66 further generates a trajectory based on the instability suppressing behavior calculated by the instability suppressing behavior calculation unit 65. For example, when the vehicle speed suppression is calculated as the instability suppressing behavior, the trajectory generation unit 66 generates the trajectory in advance such that the autonomous driving vehicle 5 performs vehicle speed suppression when approaching the behavior occurrence position.

The autonomous driving control unit 67 performs autonomous driving of the autonomous driving vehicle 5. The autonomous driving control unit 67 performs the autonomous driving of the autonomous driving vehicle 5 based on, for example, the external environment of the autonomous driving vehicle 5, the travel state of the autonomous driving vehicle 5, and the trajectory generated by the trajectory generation unit 66. The autonomous driving control unit 67 performs the instability suppressing behavior along the trajectory if the trajectory includes the instability suppressing behavior. The autonomous driving control unit 67 performs the autonomous driving of the autonomous driving vehicle 5 by transmitting a control signal to the actuator 57.

In the autonomous driving vehicle 5, the information acquisition unit 64 and the instability suppressing behavior calculation unit 65 may be provided in an ECU other than the autonomous driving ECU 60.

Processing by Information Processing System According to First Embodiment

Next, processing by the information processing system 100 according to the first embodiment will be described with reference to the drawings.

FIG. 6A is a flowchart illustrating an example of storage processing for storing the unstable behavior information in the ECU 30 of the target vehicle 2A. The storage processing for storing the unstable behavior information is performed during the operation of the ECU 30 of the target vehicle 2A. The storage processing for storing the unstable behavior information may be performed collectively for the accumulated target vehicle data. The storage processing for storing the unstable behavior information can be similarly performed in the ECUs of target vehicles 2B to 2Z other than the target vehicle 2A.

As illustrated in FIG. 6A, as S10, the ECU 30 of the target vehicle 2A acquires the target vehicle data using the target vehicle data acquisition unit 31. The target vehicle data acquisition unit 31 acquires the target vehicle data including the position information of the target vehicle 2A on the map, the external environment of the target vehicle 2A, the travel state of the target vehicle 2A, the driving operation information of the target vehicle 2A by the driver and vehicle state of the target vehicle 2A, based on the results of measurement performed by various sensors. Thereafter, the ECU 30 makes the process proceed to S12.

In S12, the ECU 30 determines whether or not the target vehicle 2A performed the unstable behavior using the behavior occurrence position recognition unit 32. The behavior occurrence position recognition unit 32 determines whether or not the target vehicle 2A performed the unstable behavior based on the target vehicle data. The behavior occurrence position recognition unit 32 determines, for example, whether or not the target vehicle 2A has slipped as an unstable behavior from the vehicle wheel speed of each wheel of the target vehicle 2A. If it is not determined that the target vehicle 2A performed the unstable behavior (NO in S12), the ECU 30 ends the current processing. If it is determined that the target vehicle 2A performed the unstable behavior (YES in S12), the ECU 30 makes the process proceed to S14.

In S14, the ECU 30 recognizes the behavior occurrence position using the behavior occurrence position recognition unit 32. The behavior occurrence position recognition unit 32 recognizes the behavior occurrence position based on the position information of the target vehicle 2A on the map when it is determined that the target vehicle 2A performed the unstable behavior. Thereafter, the ECU 30 makes the process proceed to S16.

In S16, the ECU 30 determines the cause of unstable behavior using the cause determination unit 33. The cause determination unit 33 determines whether or not the unstable behavior is caused by the driver based on at least one of the travel state of the target vehicle 2A and the driving operation information on the target vehicle 2A. In addition, the cause determination unit 33 determines whether or not the unstable behavior is caused by the vehicle based on the vehicle state of the target vehicle 2A. Thereafter, the ECU 30 makes the process proceed to S18.

In S18, the ECU 30 performs the storage processing for storing the unstable behavior information using the memory processing unit 34. If the cause of unstable behavior is determined by the cause determination unit 33, the memory processing unit 34 stores the result of determination performed by the cause determination unit 33 and the unstable behavior information in the storage database 27 in association with each other. Thereafter, the ECU 30 ends the current processing.

FIG. 6B is a flowchart illustrating an example of transmission necessity determination processing in the ECU 30 of the target vehicle 2A. The transmission necessity determination processing is performed when new unstable behavior information is stored in the above-described storage processing. The transmission necessity determination processing may be performed before the storage processing in S18 and after the cause determination processing in S16.

As illustrated in FIG. 6B, as S20, the ECU 30 determines whether or not the unstable behavior in the unstable behavior information is caused by the driver using the transmission necessity determination unit 35. The transmission necessity determination unit 35 determines whether or not the unstable behavior is caused by the driver based on the result of determination performed by the cause determination unit 33. If it is determined that the unstable behavior in the unstable behavior information is caused by the driver (YES in S20), the ECU 30 makes the process proceed to S22. If it is determined that the unstable behavior in the unstable behavior information is not caused by the driver (NO in S20), the ECU 30 makes the process proceed to S24.

In S22, the ECU 30 determines to transmit the unstable behavior information to the server 10 using the transmission necessity determination unit 35. Thereafter, the ECU 30 ends the current processing. In S24, the ECU 30 determines not to transmit the unstable behavior information to the server 10 using the transmission necessity determination unit 35. Thereafter, the ECU 30 ends the current processing. The ECU 30 may delete the unstable behavior information from the storage database 27, which was determined not to transmit to the server 10.

FIG. 7A is a flowchart illustrating an example of the determination processing whether or not the unstable behavior is caused by the driver when the unstable behavior is a slip. The determination processing whether or not the unstable behavior is caused by the driver is performed, for example, in S20 in FIG. 6B. Here, as an example, the description will be made for a case where the unstable behavior is the occurrence of a slip on the target vehicle 2A.

As illustrated in FIG. 7A, as S30, the ECU 30 determines whether or not the acceleration of the target vehicle 2A at the slip behavior occurrence position of the target vehicle 2A driven by the driver is equal to or higher than the acceleration threshold value using the cause determination unit 33. The cause determination unit 33 determines whether or not the acceleration of the target vehicle 2A (acceleration of the target vehicle 2A at the time of slip determination) at the slip behavior occurrence position is equal to or higher than the acceleration threshold value based on the acceleration, measured by the accelerator sensor.

If it is determined that the acceleration of the target vehicle 2A is equal to or higher than the acceleration threshold value (YES in S30), the ECU 30 makes the process proceed to S32. If it is determined that the acceleration of the target vehicle 2A is not equal to or higher than the acceleration threshold value (NO in S30), the ECU 30 makes the process proceed to S34.

In S32, the ECU 30 determines that the slip is caused by the driver using the cause determination unit 33. Thereafter, the current determination processing whether or not the unstable behavior is caused by the driver ends. In S34, the ECU 30 determines that the slip is not caused by the driver using the cause determination unit 33. Thereafter, the current determination processing whether or not the unstable behavior is caused by the driver ends. If the acceleration of the target vehicle 2A at the slip behavior occurrence position is not higher than the acceleration threshold value, the cause determination unit 33 does not necessarily need to determine that the slip is not caused by the driver.

FIG. 7B is a flowchart illustrating another example of the determination processing whether or not the unstable behavior is caused by the driver when the unstable behavior is a slip.

As illustrated in FIG. 7B, as S40, the autonomous driving ECU 60 determines whether or not the increase of the vehicle speed of the target vehicle 2A during the slip determination is equal to or greater than the vehicle speed increase threshold value using the cause determination unit 33. The cause determination unit 33 determines whether or not the increase of the vehicle speed of the target vehicle 2A during the slip determination is equal to or greater than the vehicle speed increase threshold value based on the result of determination of occurrence of the slip performed by the behavior occurrence position recognition unit 32 and the vehicle speed measured by the vehicle speed sensor.

If it is determined that the increase of the vehicle speed of the target vehicle 2A during the slip determination is equal to or greater than the vehicle speed increase threshold value (YES in S40), the autonomous driving ECU 60 makes the process proceed to S42. If it is determined that the increase of the vehicle speed of the target vehicle 2A during the slip determination is not equal to or greater than the vehicle speed increase threshold value (NO in S40), the autonomous driving ECU 60 makes the process proceed to S44.

In S42, the autonomous driving ECU 60 determines that the slip is caused by the driver using the cause determination unit 33. Thereafter, the current determination processing whether or not the unstable behavior is caused by the driver ends. In S44, the autonomous driving ECU 60 determines that the slip is not caused by the driver using the cause determination unit 33. Thereafter, the current determination processing whether or not the unstable behavior is caused by the driver ends. If the increase of the vehicle speed of the target vehicle 2A during the slip determination is not equal to or greater than the vehicle speed increase threshold value, the cause determination unit 33 need not necessarily need to determine that the slip is not caused by the driver.

FIG. 7C a flowchart illustrating an example of calculation processing for calculating the instability suppressing behavior by the autonomous driving ECU 60 of the autonomous driving vehicle 5. The calculation processing for calculating the instability suppressing behavior is performed at the time of performing the autonomous driving. Here, the description will be made up to the calculation of the instability suppressing behavior, and performing the instability suppressing behavior at the time of autonomous driving will not be described.

As illustrated in FIG. 7C, as S50, the autonomous driving ECU 60 acquires the unstable behavior information from the server 10 using the information acquisition unit 64. The information acquisition unit 64 transmits the traveling route for the autonomous driving vehicle 5 to the server 10, and then, extracts the unstable behavior information according to the behavior occurrence position existing on the traveling route of the autonomous driving vehicle 5 from the server 10. By receiving the unstable behavior information according to the behavior occurrence position existing on the traveling route from the server 10, the information acquisition unit 64 acquires the unstable behavior information. Thereafter, the autonomous driving ECU 60 makes the process proceed to S52.

In S52, the autonomous driving ECU 60 calculates the instability suppressing behavior using the instability suppressing behavior calculation unit 65. The instability suppressing behavior calculation unit 65 calculates the instability suppressing behavior such as the vehicle speed suppression and the steering suppression based on the unstable behavior information acquired by the information acquisition unit 64. Thereafter, the autonomous driving ECU 60 uses the result of calculation of the instability suppressing behavior for the autonomous driving.

In the information processing system 100 according to the first embodiment described above, the behavior occurrence position where the target vehicle performs an unstable behavior is recognized from the target vehicle data and whether or not the unstable behavior at the behavior occurrence position is caused by the driver is determined. Then, the unstable behavior information relating to the unstable behavior at the behavior occurrence position is associated with the result of determination performed by the cause determination unit, and the result is stored in the storage database 27. Therefore, according to the information processing system 100, the unstable behavior information at the behavior occurrence position where the target vehicle 2A (same as in the case of target vehicles 2B to 2Z) performed the unstable behavior can be stored in association with the result of determination whether or not the unstable behavior is caused by the driver.

According to the information processing system 100, for example, if the unstable behavior is a slip of the target vehicle, it is possible to determine whether or not the slip is caused by the driver based on at least one of the acceleration and the vehicle speed of the target vehicle driven by the driver.

Specifically, in the information processing system 100, because it can be said that the slip is more likely to be caused by the driver's driving operation when the acceleration of the target vehicle 2A driven by driver is high compared to a case when the acceleration is low, it can be determined that the unstable behavior is caused by the driver when the acceleration of the target vehicle 2A at the slip behavior occurrence position is equal to or greater than the acceleration threshold value, and thus, it is possible to store the fact that the slip is caused by the driver in association with the unstable behavior information. In addition, in the information processing system 100, if the unstable behavior is a slip of the target vehicle, because it can be said that the slip is more likely to be caused by the driver's driving operation when the increase of the vehicle speed of the target vehicle driven by driver during the slip determination is large compared to a case when the increase of the vehicle speed is small, it can be determined that the slip is caused by the driver when the increase of the vehicle speed of the target vehicle during the slip determination is equal to or greater than the vehicle speed increase threshold value.

Alternatively, according to the information processing system 100, if the unstable behavior is a slip of the target vehicle, it may be determined whether or not the slip is caused by the driver based on at least one of the acceleration amount, the brake operation amount, and the steering angle performed by the driver of the target vehicle.

In addition, according to the information processing system 100, since there is a case where the unstable behavior may by the vehicle state such as the tire pressure, it is possible to store the result of determination whether or not the unstable behavior is caused by the vehicle and the unstable behavior information in association with each other by determining whether or not the unstable behavior is caused by the vehicle based on the vehicle state.

Furthermore, in the information processing system 100, if it is determined that the unstable behavior is caused by the driver, since it can be considered that the unstable behavior of other vehicles same as that of the target vehicle 2A may not possibly occur again, it is possible to effectively reduce an amount of communication of the target vehicle 2A by determining not to transmit the unstable behavior information to the server 10 compared to case of transmitting all the unstable behavior information to the server 10 regardless of the cause. In addition, in the information processing system 100, if it is determined that the unstable behavior is not caused by the driver, it is also possible to accumulate the unstable behavior information that may occur again in other vehicles in the server by transmitting the unstable behavior information to the server from the target vehicle.

Second Embodiment

Next, an information processing system 200 according to a second embodiment will be described. The information processing system 200 according to the second embodiment is largely different from the case of the first embodiment in a point that the unstable behavior and the like is determined in the server without performing the determination of the unstable behavior of the target vehicle, the determination of the cause of the unstable behavior, and the transmission necessity determination according to the cause of the unstable behavior.

Configuration of Information Processing System in Second Embodiment

Figure 8:
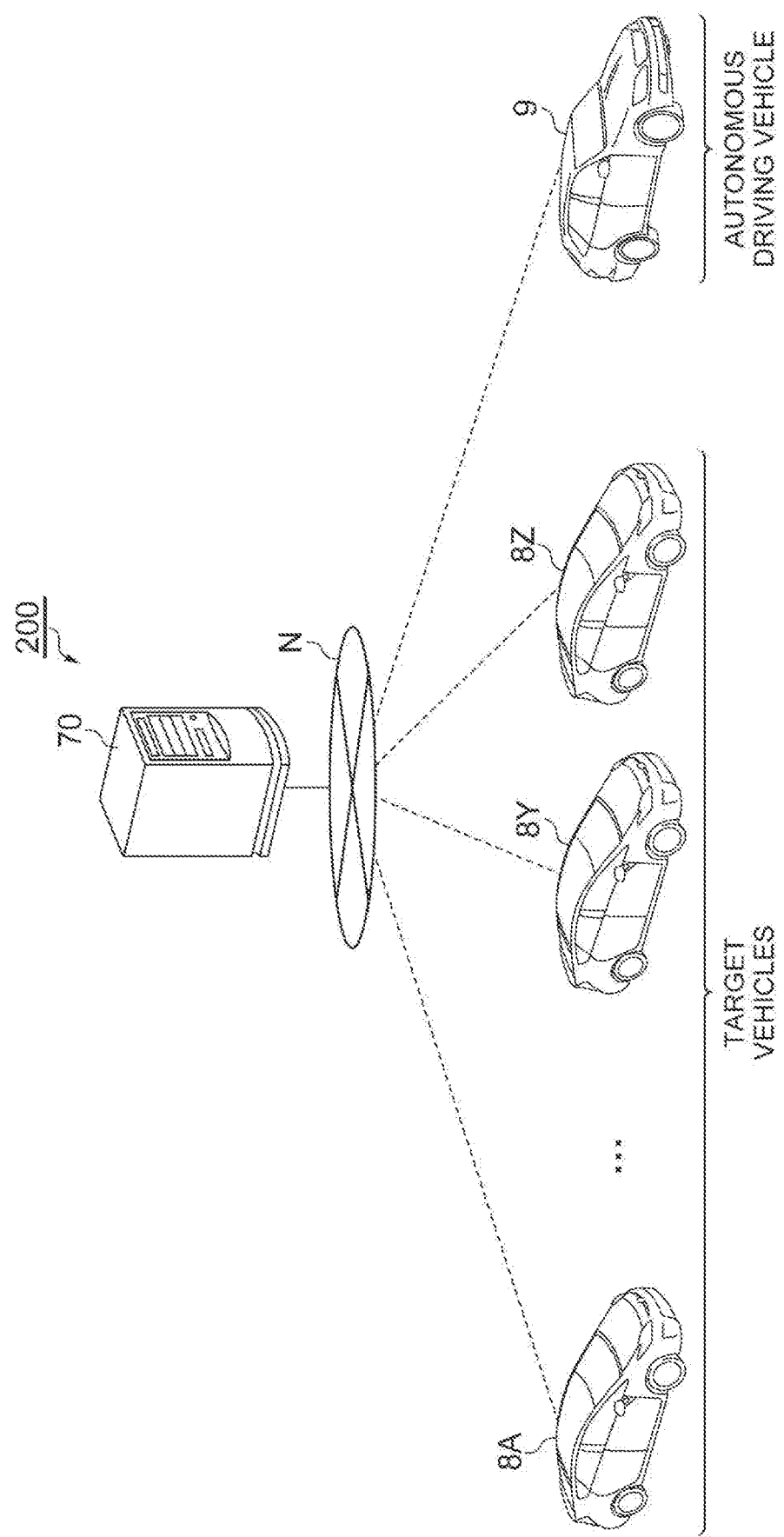
FIG. 8 is a diagram illustrating an information processing system according to a second embodiment.

FIG. 8 is a diagram illustrating the information processing system according to the second embodiment. The information processing system 200 illustrated in FIG. 8 is configured to include a server 70 and an autonomous driving ECU of an autonomous driving vehicle 9. Hereinafter, the same reference numerals will be given to the configuration elements same as that in the first embodiment and the descriptions thereof will not be repeated.

The information processing system 200 does not include the ECUs of the target vehicles 8A to 8Z. The target vehicles 8A to 8Z in the second embodiment transmit target vehicle data to the server 70, not the unstable behavior information. In this case, it may be sufficient if the ECUs of the target vehicles 8A to 8Z include, for example, only the vehicle position acquisition unit 31a, the external environment recognition unit 31b, the travel state recognition unit 31c, the driving operation information acquisition unit 31d, and the vehicle state recognition unit 31e illustrated in FIG. 4. The ECUs of the target vehicles 8A to 8Z do not necessarily need to include the behavior occurrence position recognition unit 32, the cause determination unit 33, the memory processing unit 34, and the transmission necessity determination unit 35. In addition, it is not necessary that the target vehicles 8A to 8Z include the storage database 27 for storing the unstable behavior information.

Configuration of Server

Figure 9:
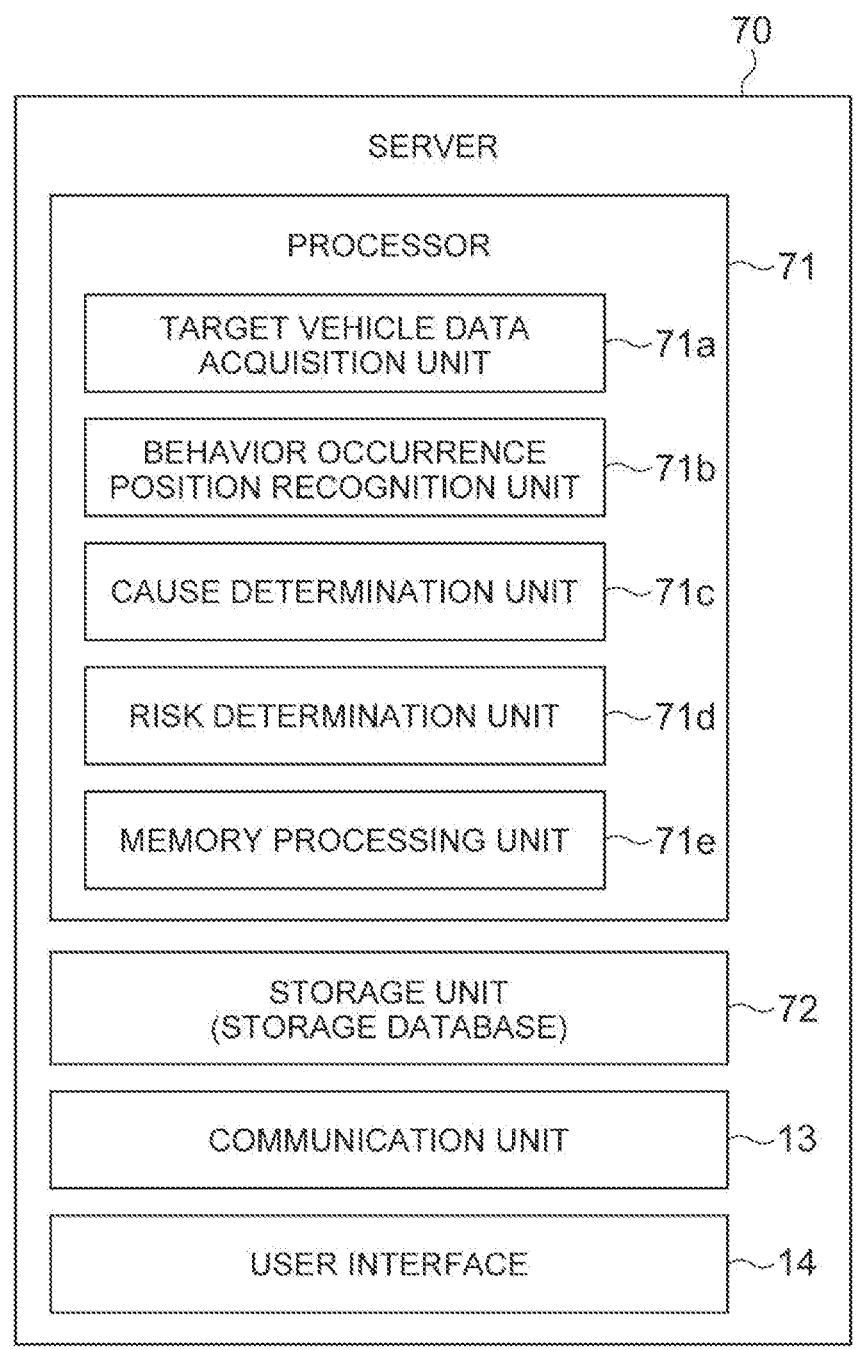
FIG. 9 is a block diagram illustrating an example of a configuration of a server according to the second embodiment.

The server 70 is provided in a facility such as an information management center, and is configured to be communicable with the target vehicles 8A to 8Z and the autonomous driving vehicle 9. FIG. 9 is a block diagram illustrating an example of the configuration of the server 70. The server 70 illustrated in FIG. 9 is configured as a general computer including a processor 71, a storage unit 72, a communication unit 13, and a user interface 14.

The processor 71 operates, for example, an operating system to control the server 70. The processor 71 is an arithmetic unit such as a CPU including a control device, an arithmetic device, a register, and the like. The processor 71 performs overall control of the storage unit 72, the communication unit 13 and the user interface 14.

The storage unit 72 is configured to include at least one of a memory and a storage. The storage unit 72 in the present embodiment functions as a storage database that stores the unstable behavior information. The storage unit 72 stores the map information and may function as a map database. The functions of the communication unit 13 and the user interface 14 are the same as those in the first embodiment, and thus, the same reference numerals are given. The server 70 does not necessarily need to be provided in a facility, and may be mounted on a mobile unit such as a vehicle or a ship.

As illustrated in FIG. 9, the processor 71 includes a target vehicle data acquisition unit 71a, a behavior occurrence position recognition unit 71b, a cause determination unit 71c, a risk determination unit 71d, and a memory processing unit 71e.

The target vehicle data acquisition unit 71a acquires the target vehicle data from the target vehicles SA to 8Z through the communication unit 13. The target vehicle data acquisition unit 71a collectively acquires the target vehicle data for a certain period. ID information (for example, a vehicle identification number) may be assigned to the target vehicle data.

The behavior occurrence position recognition unit 71b recognizes the behavior occurrence position, which is a position on the map where the target vehicle performed the unstable behavior, based on the target vehicle data acquired by the target vehicle data acquisition unit 71a. The behavior occurrence position recognition unit 71b can determine that the target vehicle performed the unstable behavior in the same manner as the behavior occurrence position recognition unit 32 in the first embodiment, and then, can recognize the behavior occurrence position.

If the behavior occurrence position is recognized by the behavior occurrence position recognition unit 71b, the cause determination unit 71c determines the cause of the unstable behavior at the behavior occurrence position. The cause determination unit 71c determines at least the driver cause and the vehicle cause as the cause of the unstable behavior.

The cause determination unit 71c determines whether or not the unstable behavior is caused by the driver based on at least one of the travel state of the target vehicle included in the target vehicle data and the driving operation information on the target vehicle. The cause determination unit 71c determines whether or not the unstable behavior is caused by the vehicle based on the vehicle information on the target vehicle included in the target vehicle data. The cause determination unit 71c can determine the cause of the unstable behavior in the same manner as the cause determination unit 33 in the first embodiment.

In addition, if a behavior causing location is specified based on the target vehicle data and the behavior occurrence position, the cause determination unit 71c in the present embodiment determines that the unstable behavior at the behavior causing location is not caused by the driver. The behavior causing location is, for example, a location (position) on the map where the number of times the target vehicle performed the unstable behavior is equal to or greater than the number of times threshold value. The number of times threshold value is a threshold value having a value set in advance. The behavior causing location may be determined as a section of a fixed distance.

The cause determination unit 71c specifies the behavior causing location based on the behavior occurrence position recognized by the behavior occurrence position recognition unit 71b. The cause determination unit 71c specifies the behavior causing location by, for example, counting the number of times of the repetition of the behavior occurrence position recognized for each unstable behavior as the number of times the target vehicle performed the unstable behavior. The behavior causing location does not necessarily need to be one location on the map, and may be a section of a certain range.

If the number of times (that is, a frequency) the target vehicle performed the unstable behavior for a fixed period is equal to or greater than the number of times threshold value, the cause determination unit 71c may specify the location as the behavior causing location. The fixed period is not particularly limited, but may be a few hours or may be a day. The cause determination unit 71c may determine that the unstable behavior at the behavior causing location is caused by the position cause.

Even if the determination of the cause of the unstable behavior is completed based on at least one of the travel state of the target vehicle and the driving operation information of the target vehicle, the cause determination unit 71c gives priority to the result of determination (not the driver cause) using the behavior causing location.

In addition, the cause determination unit 71c may separately count the number of times for each content of the unstable behavior. The cause determination unit 71c specifies, for example, a position on the map where the number of times of the slip is equal to or greater than the number of times threshold value as the behavior causing location. The cause determination unit 71c may specify a position on the map where the number of times of the sudden deceleration is equal to or greater than the number of times threshold value as the behavior causing location. The number of times threshold value may have a value different for each content of the unstable behavior.

If the number of times is counted for each content of the unstable behavior, the cause determination unit 71c may specify the behavior causing location for each content of the unstable behavior. The cause determination unit 71c determines that the slip occurring at the slip behavior causing location is not caused by the driver. The cause determination unit 71c does not necessarily need to determine that the sudden deceleration occurring at the slip behavior causing location is not caused by the driver.

The risk determination unit 71d determines a risk of unstable behavior for each behavior occurrence position based on the cause of the unstable behavior determined by the cause determination unit 71c. The risk determination unit 71d determines the risk of unstable behavior that is determined to be caused by the position cause as High, and determines the risk of unstable behavior that is determined to be caused by the driver or the vehicle as Middle or Low.

Even if the risk of the unstable behavior is determined as Low, when the unstable behavior is repeated at the same behavior occurrence position, the risk determination unit 71d may change the risk to Middle or High. The same is applicable to the change from Middle to High. The risk determination unit 71d may determine the risk of the unstable behavior in which is prone to stop the autonomous driving based on the content of unstable behavior.

If the cause of the unstable behavior is determined by the cause determination unit 71c, the memory processing unit 71e associates the unstable behavior information with the result of determination performed by the cause determination unit 71c, and stores the result in the storage unit 72. Not only if it is determined by the cause determination unit 71c that the unstable behavior is caused by the driver or the vehicle, but also if it is determined that the unstable behavior is not caused by the driver or the vehicle, the memory processing unit 71e stores the result of determination in the storage unit 72 in association with the unstable behavior information. In addition, the memory processing unit 71e associates the unstable behavior information with the result of risk determination performed by the risk determination unit 71d, and stores the result in the storage unit 72.

Configuration of Autonomous Driving Vehicle

The autonomous driving ECU 90 of the autonomous driving vehicle 9 in the second embodiment is different from that in the first embodiment in a point that a control amount of the instability suppressing behavior is changed according to the cause of the unstable behavior. The information acquisition unit 64 of the autonomous driving ECU 90 acquires not only the unstable behavior information that is determined not to be caused by the driver but also the unstable behavior information that is determined to be caused by the driver, from the server 70. Since the information acquisition unit 64 has the same function as that in the first embodiment, the same reference numeral is assigned.

When the unstable behavior is caused by the driver, the instability suppressing behavior calculation unit 91 of the autonomous driving ECU 90 sets the control amount of the instability suppressing behavior in the autonomous driving to be smaller than that when the unstable behavior is not caused by the driver. The control amount of the instability suppressing behavior is, for example, an amount of deceleration when the instability suppressing behavior is a vehicle speed suppression by the deceleration. If the instability suppressing behavior is the vehicle speed suppression by the reduction of the upper speed limit, the control amount of the instability suppressing behavior can be an amount of reducing the upper limit of vehicle speed. If the instability suppressing behavior is the steering suppression, the control amount of the instability suppressing behavior can be an amount of steering avoidance.

Specifically, for example, when the unstable behavior is caused by the driver, the instability suppressing behavior calculation unit 91 sets the amount of deceleration for a case of driver cause as the amount of deceleration of the vehicle speed suppression as the instability suppressing behavior. When the unstable behavior is not caused by the driver, the instability suppressing behavior calculation unit 91 sets the amount of deceleration for a normal case as the amount of deceleration of the vehicle speed suppression. The amount of deceleration for the case of driver cause is smaller than the amount of deceleration for the normal case. Similarly, when the unstable behavior is caused by the driver, the instability suppressing behavior calculation unit 91 sets an amount of steering for a case of driver cause as the amount of steering of steering suppression as the instability suppressing behavior. When the unstable behavior is not caused by the driver, the instability suppressing behavior calculation unit 91 sets the amount of steering for a normal case as the amount of steering of the steering suppression. The amount of steering for the case of driver cause is smaller than the amount of steering for the normal case.

When the unstable behavior is caused by the vehicle, the instability suppressing behavior calculation unit 91 may set the control amount of the instability suppressing behavior in autonomous driving smaller than that when the unstable behavior is not caused by the vehicle. When the unstable behavior is caused by the position cause, the instability suppressing behavior calculation unit 91 does not reduce the control amount of the instability suppressing behavior. The instability suppressing behavior calculation unit 91 may be configured not to calculate the instability suppressing behavior when the unstable behavior is caused by the driver.

Processing by Information Processing System According to Second Embodiment

Figure 11:
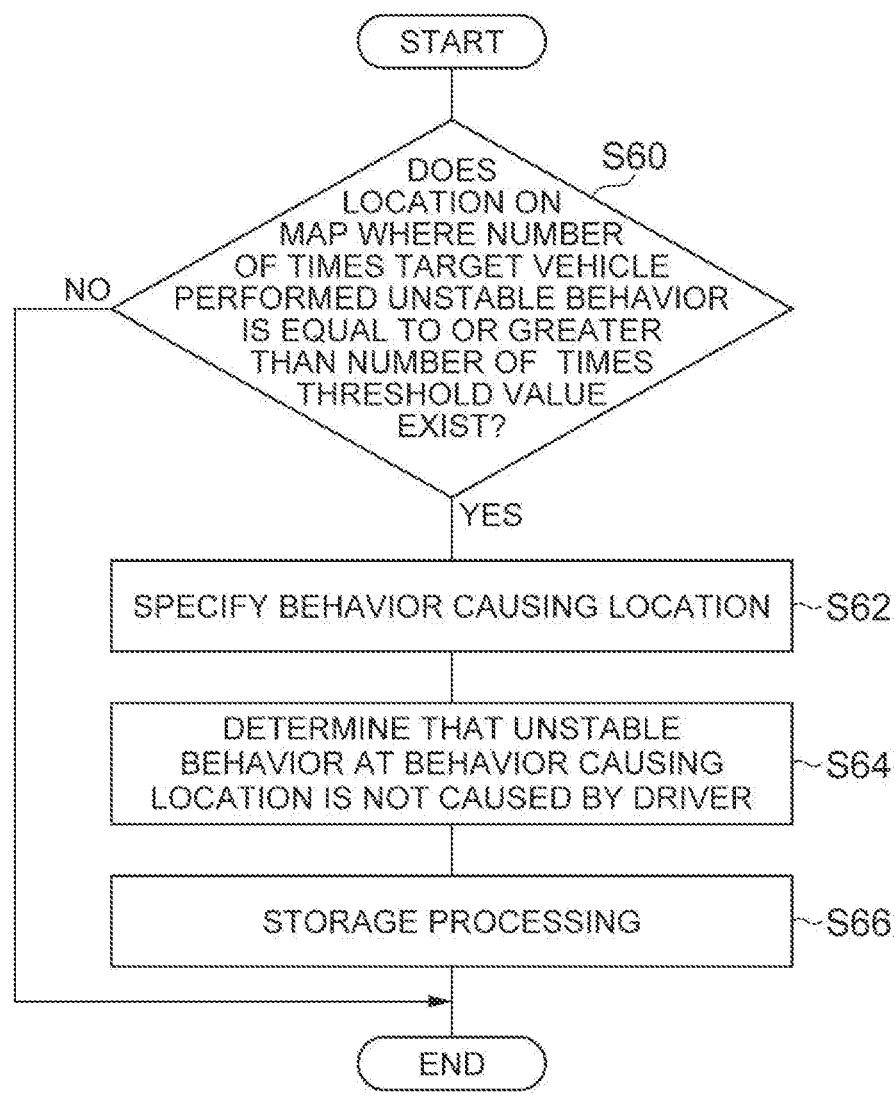
FIG. 11 is a flowchart illustrating an example of a specification processing for specifying a behavior causing location according to the second embodiment.

Next, processing by the information processing system 200 according to the second embodiment will be described with reference to the drawings. First, similarly to the ECU 30 of the target vehicle 2A in the first embodiment, the processor 71 of the server 70 can perform the storage processing for storing the unstable behavior information illustrated in FIG. 6A. Here, FIG. 11 is a flowchart illustrating an example of the specification processing for specifying the behavior causing location according to the second embodiment. For example, if a certain amount of target vehicle data are accumulated, the server 70 periodically performs the specification processing for specifying the behavior causing location.

As illustrated in FIG. 11, as S60, the processor 71 of the server 70 determines whether or not there exists a location on the map where the number of times the target vehicle performed the unstable behavior determined by the cause determination unit 71c is equal to or greater than the number of times threshold value. The cause determination unit 71c performs the determination by, for example, counting the number of times of repetition of the behavior occurrence position recognized for each unstable behavior as the number of times the target vehicle performed the unstable behavior.

If it is not determined that there exists a location on the map where the number of times the target vehicle performed the unstable behavior is equal to or greater than the number of times threshold value (NO in S60), the processor 71 ends the current processing. If it is determined that there exists a location on the map where the number of times the target vehicle performed the unstable behavior is equal to or greater than the number of times threshold value (YES in S60), the processor 71 makes the process proceed to S62.

In S62, the processor 71 specifies the behavior causing location using the cause determination unit 71c. The cause determination unit 71c specifies the location on the map where the number of times of the unstable behavior is equal to or greater than the number of times threshold value as the behavior causing location. Thereafter, the processor 71 makes the process proceed to S64.

In S64, the processor 71 determines that the unstable behavior at the behavior causing location is not caused by the driver using the cause determination unit 71c. Even if the cause of the unstable behavior has been determined based on at least one of the travel state of the target vehicle and the driving operation information of the target vehicle, the cause determination unit 71c gives priority to the result of determination using the behavior causing location. Thereafter, the processor 71 makes the process proceed to S66.

In S66, the processor 71 performs the storage processing using the memory processing unit 71e. The memory processing unit 71e associates the unstable behavior information with the result of determination performed by the cause determination unit 71c, and then, stores the result in the storage unit 72. If the risk determination is performed by the risk determination unit 71d, the memory processing unit 71e may associate the unstable behavior information with the result of the risk determination performed by the risk determination unit 71d, and then, may store the result in the storage unit 72. Thereafter, the processor 71 ends the current processing.

Figure 12A:
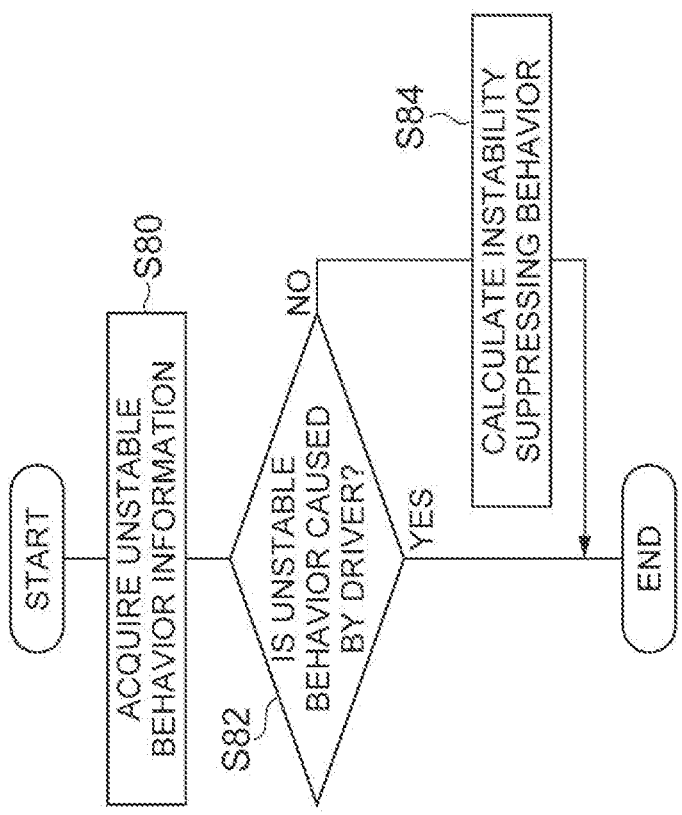
FIG. 12A is a flowchart illustrating an example of calculation processing for calculating the instability suppressing behavior according to the second embodiment.

Next, the processing by the autonomous driving ECU 90 in the autonomous driving vehicle 9 in the second embodiment will be described. FIG. 12A is a flowchart illustrating an example of calculation processing for calculating the instability suppressing behavior according to the second embodiment. The calculation processing for calculating the instability suppressing behavior is performed at the time of performing the autonomous driving.

As illustrated in FIG. 12A, as S70, the autonomous driving ECU 90 acquires the unstable behavior information from the server 70 using the information acquisition unit 64. The processing in S70 is the same as the processing in S50 in FIG. 7C. The information acquisition unit 64 transmits the path of the autonomous driving vehicle 5 to the server 70, for example, and then, extracts the unstable behavior information according to the behavior occurrence position existing on the autonomous driving vehicle 5 path from the server 70. By receiving the unstable behavior information according to the behavior occurrence position existing on the path from the server 70, the information acquisition unit 64 acquires the unstable behavior information. Thereafter, the autonomous driving ECU 90 makes the process proceed to S72.

In S72, the autonomous driving ECU 90 determines whether or not the unstable behavior is caused by the driver using the instability suppressing behavior calculation unit 91. The instability suppressing behavior calculation unit 91 determines whether or not the unstable behavior is caused by the driver based on the unstable behavior information acquired by the information acquisition unit 64. If it is determined that the unstable behavior is not caused by the driver (NO in S74), the autonomous driving ECU 90 makes the process proceed to S72. If it is determined that the unstable behavior is caused by the driver (yes in S72), the autonomous driving ECU 90 makes the process proceed to S76.

In S74, The autonomous driving ECU 90 calculates the instability suppressing behavior as the control amount for the normal case using the instability suppressing behavior calculation unit 91. For example, the instability suppressing behavior calculation unit 91 sets the amount of deceleration for the normal case as the amount of deceleration of the vehicle speed suppression as the instability suppressing behavior. Thereafter, the autonomous driving ECU 90 uses the result of calculation of the instability suppressing behavior for the autonomous driving.

In S76, the autonomous driving ECU 90 calculates the instability suppressing behavior as a control amount for the case of driver cause using the instability suppressing behavior calculation unit 91. The control amount for the case of driver cause is a control amount smaller than a control amount for the normal case. For example, the instability suppressing behavior calculation unit 91 sets an amount of deceleration for the case of driver cause as an amount of deceleration of the vehicle speed suppression as the instability suppressing behavior. Thereafter, the autonomous driving ECU 90 uses the result of the calculation of the instability suppressing behavior for the autonomous driving.

Figure 12B:
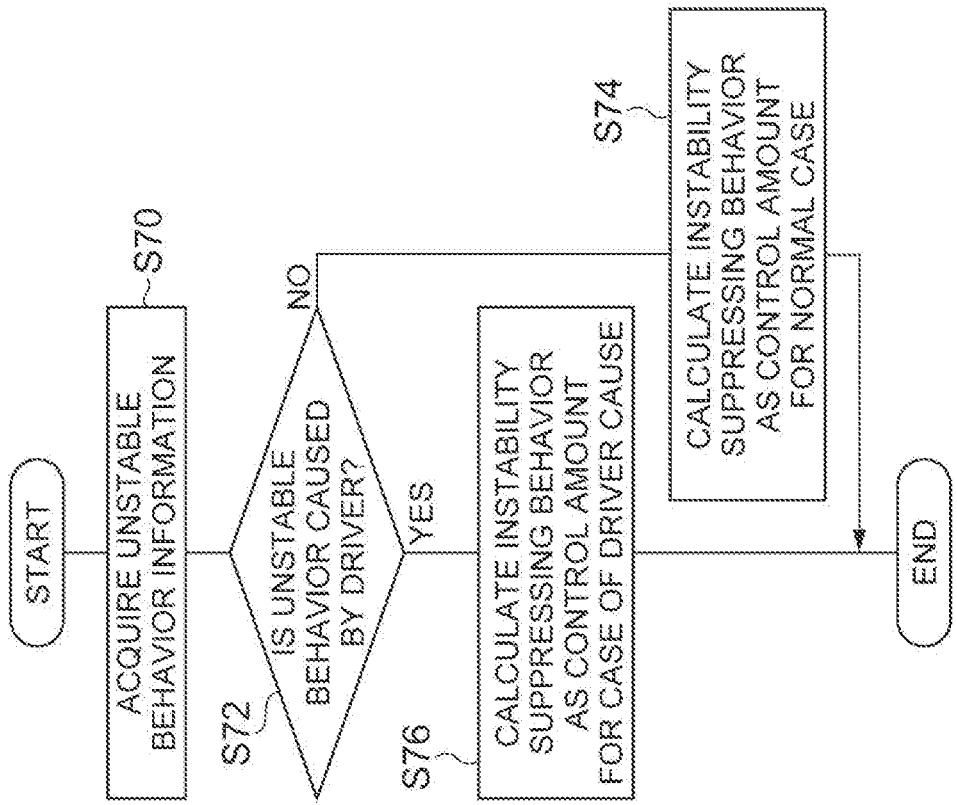
FIG. 12B is a flowchart illustrating another example of calculation processing for calculating the instability suppressing behavior according to the second embodiment.

FIG. 12B is a flowchart illustrating another example of calculation processing for calculating the instability suppressing behavior according to the second embodiment. As illustrated in FIG. 12B, as S80, the autonomous driving ECU 90 acquires the unstable behavior information from the server 70 using the information acquisition unit 64. The processing in S80 is the same as the processing in S70 illustrated in FIG. 12A. In addition, the next processing S82 is also the same as the processing in S72.

In S82, the autonomous driving ECU 90 determines whether or not the unstable behavior is caused by the driver using the instability suppressing behavior calculation unit 91. If it is determined that the unstable behavior is caused by the driver (YES in S82), the autonomous driving ECU 90 ends the current processing. That is, the instability suppressing behavior calculation unit 91 does not calculate the instability suppressing behavior if the unstable behavior is caused by the driver. If it is determined that the unstable behavior is not caused by the driver (NO in S82), the autonomous driving ECU 90 makes the process proceed to S84.

In S84, the autonomous driving ECU 90 calculates the instability suppressing behavior using the instability suppressing behavior calculation unit 91. In this case, the instability suppressing behavior calculation unit 91 calculates the instability suppressing behavior as the control amount for the normal case. Thereafter, the autonomous driving ECU 90 uses the result of calculation of the instability suppressing behavior for the autonomous driving.

According to the information processing system 200 in the second embodiment described above, similarly to the first embodiment, the unstable behavior information at the behavior occurrence position where the target vehicle performed the unstable behavior and the result of determination whether or not the unstable behavior is caused by the driver can be associated with other, and then, the result can be stored. In addition, in the information processing system 200, if the target vehicle's unstable behavior is repeated at the same location, the unstable behavior is highly possibly caused by a location, not by the driver, it is possible to specify the behavior causing location where the number of times the target vehicle performed the unstable behavior is equal to or greater than the number of times threshold value, and then, it is possible to determine that the unstable behavior is caused by the driver.

Furthermore, according to the information processing system 200, when the autonomous driving ECU 90 determines that the unstable behavior is caused by the driver, the control amount of the instability suppressing behavior is set smaller for the autonomous driving than that when the unstable behavior is not caused by the driver, or the instability suppressing behavior is not calculated. Therefore, according to the information processing system 200, it is possible to avoid performing an excessive instability suppressing behavior such as the deceleration at the unstable behavior occurrence position that is determined to be caused by the driver but not possible caused by the location. Therefore, it is possible to prevent the instability suppressing behavior from giving a discomfort to the driver of the autonomous driving vehicle 9.

The embodiments of the present disclosure are described above, however, the present disclosure is not limited to the embodiments described above. In addition to the above-described embodiments, the present disclosure can be embodied in various forms including various modifications and improvements based on the knowledge of those skilled in the art.

The information processing system 100 does not necessarily include the server 10 and the autonomous driving ECU 60, and may be configured to include the ECU 30 of the target vehicle 2A. In this case, the information processing system 100 may provide the unstable behavior information in association with the cause of the unstable behavior, to the surrounding autonomous driving vehicle 5 from the target vehicle 2A without using the server 10.

In addition, the information processing system 100 may be configured include the server 10 and the ECU 30 of the target vehicle 2A without including the autonomous driving ECU 60 of the autonomous driving vehicle 5.

Alternatively, the information processing system 100 may be configured to include the ECU 30 of the target vehicle 2A and the autonomous driving ECU 60 of the autonomous driving vehicle 5 without including the server 10. In this case also, the information processing system 100 can provide the unstable behavior information in association with the cause of the unstable behavior, to the surrounding autonomous driving vehicle 5 from the target vehicle 2A without using the server 10.

The ECU 30 of the target vehicle 2A does not necessarily need to include the transmission necessity determination unit 35, and may transmit the unstable behavior information determined as being caused by the driver, to the server 10. In this case, the storage database 27 does not need to be mounted on the target vehicle 2A, and may be formed in the server 10.

The information processing system 200 according to the second embodiment may be configured to include the server 70 without including the autonomous driving ECU 90 of the autonomous driving vehicle 9.

Figure 10:
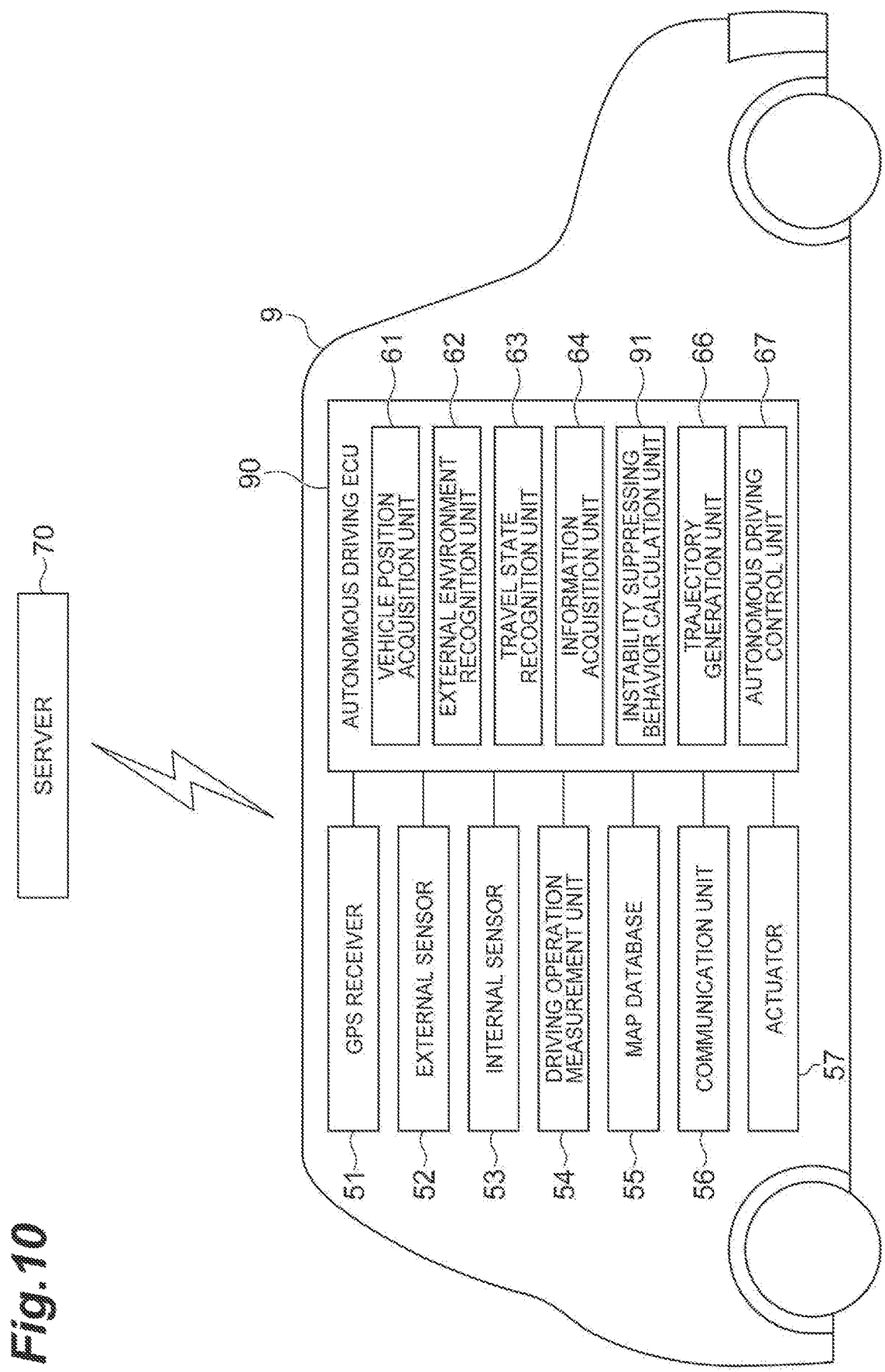
FIG. 10 is a block diagram, illustrating an example of a configuration of an autonomous driving vehicle according to the second embodiment.

In addition, the information processing system 200 can also be configured to include the autonomous driving ECU 90 without including the server 70 by causing the autonomous driving ECU 90 of the autonomous driving vehicle 9 to have the function of server 70. That is, in the configuration of the autonomous driving vehicle 9 illustrated in FIG. 10, the autonomous driving ECU 90 illustrated in FIG. 9 may be caused to include the target vehicle data acquisition unit 71a, the behavior occurrence position recognition unit 71b, and the cause determination unit 71c, and the storage database 27 of the target vehicle 2A illustrated in FIG. 4 may be mounted on the autonomous driving vehicle 9.

The information processing system 200 according to the second embodiment may include not only the target vehicles 8A to 8Z but also the target vehicles 2A to 2Z in the first embodiment as the vehicles from which the information is collected. At this time, the server 70 of the information processing system 200 may acquire not only the unstable behavior information associated with the cause of the unstable behavior but also the target vehicle data from the target vehicles 2A to 2Z. By determining the cause of the unstable behavior based on the target vehicle data, the server 70 can determine twice the cause of the unstable behavior on the target vehicles 2A to 2Z side and the server 70 side, and thus, it is possible to improve the accuracy of determination of the cause of unstable behavior.

In the information processing systems 100 and 200, the vehicles from which the information is collected may serve as the vehicles for which the information is provided. For example, in the autonomous driving ECU 60 of the autonomous driving vehicle 5 illustrated in FIG. 5, by having the function of the ECU 30 of the target vehicle 2A illustrated in FIG. 4, it is possible to serve as both the vehicles from which the information is collected and the vehicles for which the information is provided. Instead of the autonomous driving ECU 60 of the autonomous driving vehicle 5 illustrated in FIG. 5, the autonomous driving ECU 90 of the autonomous driving vehicle 9 illustrated in FIG. 10 may be used. If the target vehicle has an autonomous driving function, the determination whether or not the unstable behavior is caused by the driver may be performed only for the unstable behavior when the target vehicle is in the manual driving by the driver. In the information processing systems 100 and 200, if the target vehicle 2A is not in the autonomous driving, it can be assumed that the driver is driving.

In the information processing systems 100 and 200, the vehicle for which the information is provided is not limited to the autonomous driving vehicle. The unstable behavior information associated with the cause of the unstable behavior may be provided for the vehicle without the autonomous driving function. For the vehicle without the autonomous driving function, for example, the driver can be alerted by notifying of the unstable behavior information. In the information processing systems 100 and 200, the vehicles without the autonomous driving function may be any of the vehicles from which the information is collected and the vehicles for which the information is provided.

The cause determination units 33 and 71c do not necessarily need to determine whether or not the unstable behavior is caused by the vehicle. In this case, the target vehicle data does not need to include 1.0 the vehicle information. The target vehicle data acquisition unit 31 of the target vehicle 2A illustrated in FIG. 4 does not need to include the vehicle state recognition unit 31e. In addition, the target vehicle data does not need to include the external environment of the target vehicle.

In the information processing systems 100 and 200, the calculation of the instability suppressing behavior may be performed in the servers 10 and 70 side instead of the autonomous driving vehicles 5 and 9. That is, in the servers 10 and 70, by acquiring the traveling route information for the autonomous driving from the autonomous driving vehicles 5 and 9, the unstable behavior information according to the behavior occurrence position on the traveling route may be acquired, and then, the instability suppressing behavior may be calculated. In the servers 10 and 70, the above-described acquisition and calculation can be realized by having the functions of the information acquisition unit 64 and the instability suppressing behavior calculation unit 65 illustrated in FIG. 5 (or the information acquisition unit 64 and the instability suppressing behavior calculation unit 91 illustrated in in FIG. 10).

In the information processing system 200, the cause determination unit 71c does not necessarily need to specify the behavior causing location. In addition, the server 70 does not necessarily need to include the risk determination unit 71d, and does not need to associate the information on the risk determination with the unstable behavior information.

In the autonomous driving ECUs 60 and 90, the instability suppressing behavior does not necessarily need to be included in the trajectory, and the instability suppressing behavior is performed when the autonomous driving vehicles 5 and 9 approach the behavior occurrence position independent of the trajectory. In addition, the autonomous driving ECUs 60 and 90 do not necessarily need to include the instability suppressing behavior calculation units 65 and 91. The autonomous driving ECUs 60 and 90 may use the unstable behavior information only for the generation of the trajectory, and may only provide the unstable behavior information for the driver. In addition, the autonomous driving ECUs 60 and 90 may search for the traveling route based on the unstable behavior information around the autonomous driving vehicles 5 and 6 so as to avoid the behavior occurrence position. The autonomous driving ECUs 60 and 90 may search for the traveling route so as to preferentially avoid the behavior occurrence position of the unstable behavior which is determined not caused by the driver.

In addition, the driving operation information acquisition unit 31d does not necessarily need to store the driving operation history. The cause determination units 33 and 71c do not necessarily need to recognize the driving operation tendency of the driver.

What is claimed is:

1. An information processing system that acquires target vehicle data for determining the cause of unstable behavior of a target vehicle, comprising:
   a target vehicle data acquisition unit configured to acquire the target vehicle data including a travel state of the target vehicle, driving operation information of the target vehicle, and position information of the target vehicle on a map, wherein the travel state of the target vehicle includes at least one of an acceleration and a vehicle speed of the target vehicle driven by a driver, and the driving operation information includes at least one of an amount of accelerator operation, an amount of brake operation, and an amount of steering by the driver;
   a behavior occurrence position recognition unit configured to recognize a behavior occurrence position that is a position where the target vehicle performs an unstable behavior, based on the target vehicle data, wherein the unstable behavior includes a slip of the target vehicle;
   a cause determination unit configured to determine whether or not the unstable behavior at the behavior occurrence position is caused by the driver, based on at least one of the travel state of the target vehicle and the driving operation information of the target vehicle;

a memory processing unit configured to associate, then store in a storage database, the result of determination performed by the cause determination unit with unstable behavior information relating to the unstable behavior at the behavior occurrence position; and use the result for autonomous driving of an autonomous driving vehicle.

2. The information processing system according to claim 1,
wherein, if an acceleration of the target vehicle at the slip behavior occurrence position of the target vehicle driven by the driver is equal to or greater than an acceleration threshold value, the cause determination unit is configured to determine that the slip of the target vehicle is caused by the driver.

3. The information processing system according to claim 2,
wherein a vehicle state of the target vehicle is included in the target vehicle data,
wherein the cause determination unit is configured to determine whether or not the unstable behavior at the behavior occurrence position is caused by a vehicle cause, based on the vehicle state of the target vehicle, and
wherein, if the cause determination unit has determined whether or not the unstable behavior at the behavior occurrence position is caused by the vehicle, the memory processing unit is configured to associate the unstable behavior information relating to the unstable behavior at the behavior occurrence position with the result of determination performed by the cause determination unit, and, to store the result in the storage database.

4. The information processing system according to claim 2, further comprising:
a server configured to be capable of communicating with the plurality of target vehicles,
wherein the server is configured to include the cause determination unit, and
wherein, if a behavior causing location where the number of times the target vehicle performed the unstable behavior is equal to or greater than the number of times threshold value is specified based on the behavior occurrence position recognized by the behavior occurrence position recognition unit, the cause determination unit is configured to determine that the unstable behavior at the behavior causing location is not caused by the driver.

5. The information processing system according to claim 1,
wherein the cause determination unit is configured to determine whether or not the slip of the target vehicle is caused by the driver, based on at least the driving operation information of the target vehicle.

6. The information processing system according to claim 5,
wherein a vehicle state of the target vehicle is included in the target vehicle data,
wherein the cause determination unit is configured to determine whether or not the unstable behavior at the behavior occurrence position is caused by a vehicle cause, based on the vehicle state of the target vehicle, and
wherein, if the cause determination unit has determined whether or not the unstable behavior at the behavior occurrence position is caused by the vehicle, the memory processing unit is configured to associate the unstable behavior information relating to the unstable behavior at the behavior occurrence position with the result of determination performed by the cause determination unit, and, to store the result in the storage database.

7. The information processing system according to claim 5, further comprising:
a server configured to be capable of communicating with the plurality of target vehicles,
wherein the server is configured to include the cause determination unit, and
wherein, if a behavior causing location where the number of times the target vehicle performed the unstable behavior is equal to or greater than the number of times threshold value is specified based on the behavior occurrence position recognized by the behavior occurrence position recognition unit, the cause determination unit is configured to determine that the unstable behavior at the behavior causing location is not caused by the driver.

8. The information processing system according to claim 1,
wherein the cause determination unit is configured to determine whether or not the slip of the target vehicle is caused by the driver, based on at least the travel state of the target vehicle.

9. The information processing system according to claim 8,
wherein a vehicle state of the target vehicle is included in the target vehicle data,
wherein the cause determination unit is configured to determine whether or not the unstable behavior at the behavior occurrence position is caused by a vehicle cause, based on the vehicle state of the target vehicle, and
wherein, if the cause determination unit has determined whether or not the unstable behavior at the behavior occurrence position is caused by the vehicle, the memory processing unit is configured to associate the unstable behavior information relating to the unstable behavior at the behavior occurrence position with the result of determination performed by the cause determination unit, and, to store the result in the storage database.

10. The information processing system according to claim 8, further comprising:
a server configured to be capable of communicating with the plurality of target vehicles,
wherein the server is configured to include the cause determination unit, and
wherein, if a behavior causing location where the number of times the target vehicle performed the unstable behavior is equal to or greater than the number of times threshold value is specified based on the behavior occurrence position recognized by the behavior occurrence position recognition unit, the cause determination unit is configured to determine that the unstable behavior at the behavior causing location is not caused by the driver.

11. The information processing system according to claim 1,
wherein, if an increase of the vehicle speed of the target vehicle during the slip determination is equal to or greater than a vehicle speed increase threshold value, the cause determination unit is configured to determine that the slip is caused by the driver.

12. The information processing system according to claim 11,
  wherein a vehicle state of the target vehicle is included in the target vehicle data,
  wherein the cause determination unit is configured to determine whether or not the unstable behavior at the behavior occurrence position is caused by a vehicle cause, based on the vehicle state of the target vehicle, and
  wherein, if the cause determination unit has determined whether or not the unstable behavior at the behavior occurrence position is caused by the vehicle, the memory processing unit is configured to associate the unstable behavior information relating to the unstable behavior at the behavior occurrence position with the result of determination performed by the cause determination unit, and, to store the result in the storage database.

13. The information processing system according to claim 11, further comprising:
  a server configured to be capable of communicating with the plurality of target vehicles,
  wherein the server is configured to include the cause determination unit, and
  wherein, if a behavior causing location where the number of times the target vehicle performed the unstable behavior is equal to or greater than the number of times threshold value is specified based on the behavior occurrence position recognized by the behavior occurrence position recognition unit, the cause determination unit is configured to determine that the unstable behavior at the behavior causing location is not caused by the driver.

14. The information processing system according to claim 1,
  wherein a vehicle state of the target vehicle is included in the target vehicle data,
  wherein the cause determination unit is configured to determine whether or not the unstable behavior at the behavior occurrence position is caused by a vehicle cause, based on the vehicle state of the target vehicle, and
  wherein, if the cause determination unit has determined whether or not the unstable behavior at the behavior occurrence position is caused by the vehicle, the memory processing unit is configured to associate the unstable behavior information relating to the unstable behavior at the behavior occurrence position with the result of determination performed by the cause determination unit, and, to store the result in the storage database.

15. The information processing system according to claim 14, further comprising:
  a server configured to be capable of communicating with the plurality of target vehicles,
  wherein the server is configured to include the cause determination unit, and
  wherein, if a behavior causing location where the number of times the target vehicle performed the unstable behavior is equal to or greater than the number of times threshold value is specified based on the behavior occurrence position recognized by the behavior occurrence position recognition unit, the cause determination unit is configured to determine that the unstable behavior at the behavior causing location is not caused by the driver.

16. The information processing system according to claim 1, further comprising:
  a server configured to be capable of communicating with the plurality of target vehicles,
  wherein the server is configured to include the cause determination unit, and
  wherein, if a behavior causing location where the number of times the target vehicle performed the unstable behavior is equal to or greater than the number of times threshold value is specified based on the behavior occurrence position recognized by the behavior occurrence position recognition unit, the cause determination unit is configured to determine that the unstable behavior at the behavior causing location is not caused by the driver.

17. The information processing system according to claim 1, further comprising:
  an information acquisition unit configured to acquire the unstable behavior information according to the behavior occurrence position existing on a traveling route of the autonomous driving based on the traveling route of the autonomous driving set in advance in the autonomous driving vehicle and the unstable behavior information stored in the database; and
  an instability suppressing behavior calculation unit configured to calculate an instability suppressing behavior for suppressing the autonomous driving vehicle from performing the unstable behavior based on the unstable behavior information acquired by the information acquisition unit, and
  wherein, when the unstable behavior is caused by the driver, the instability suppressing behavior calculation unit is configured to set a control amount of the instability suppressing behavior in the autonomous driving smaller than that when the unstable behavior is not caused by the driver, or the instability suppressing behavior calculation unit is configured not to calculate the instability suppressing behavior when the unstable behavior is caused by the driver.

18. The information processing system according to claim 1,
  wherein the target vehicle data acquisition unit, the behavior occurrence position recognition unit, and the cause determination unit are configured to be mounted on the target vehicle,
  wherein the information processing system further comprises
  a server, and
  a transmission necessity determination unit configured to be mounted on the target vehicle and to determine whether or not to transmit the unstable behavior information to the server,
  wherein, if it is determined by the cause determination unit that the unstable behavior is caused by the driver, the transmission necessity determination unit is configured to determine not to transmit the unstable behavior information to the server from the target vehicle.

19. The information processing system according to claim 18,
  wherein, if it is determined by the cause determination unit that the unstable behavior is not caused by the driver, the transmission necessity determination unit is configured to determine to transmit the unstable behavior information to the server from the target vehicle.

20. A server that acquires target vehicle data for determining the cause of unstable behavior of a target vehicle, comprising:

a target vehicle data acquisition unit configured to acquire target vehicle data including a travel state of a target vehicle, driving operation information of the target vehicle, and position information of the target vehicle on a map, wherein the travel state of the target vehicle includes at least one of an acceleration and a vehicle speed of the target vehicle driven by a driver, and the driving operation information includes at least one of an amount of accelerator operation, an amount of brake operation, and an amount of steering by the driver;

a behavior occurrence position recognition unit configured to recognize a behavior occurrence position that is a position where the target vehicle performs an unstable behavior, based on the target vehicle data, wherein the unstable behavior includes a slip of the target vehicle;

a cause determination unit configured to determine whether or not the unstable behavior at the behavior occurrence position is caused by the driver, based on at least one of the travel state of the target vehicle and the driving operation information of the target vehicle; and a memory processing unit configured to associate, then store in a storage database, the result of determination performed by the cause determination unit with unstable behavior information relating to the unstable behavior at the behavior occurrence position; and use the result for autonomous driving of an autonomous driving vehicle.

\* \* \* \* \*